US012051225B2

(12) United States Patent
Price et al.

(10) Patent No.: US 12,051,225 B2
(45) Date of Patent: Jul. 30, 2024

(54) GENERATING ALPHA MATTES FOR DIGITAL IMAGES UTILIZING A TRANSFORMER-BASED ENCODER-DECODER

(71) Applicant: Adobe Inc., San Jose, CA (US)

(72) Inventors: Brian Price, San Jose, CA (US); Yutong Dai, Adelaide (AU); He Zhang, San Jose, CA (US)

(73) Assignee: Adobe Inc., San Jose, CA (US)

( * ) Notice: Subject to any disclaimer, the term of this patent is extended or adjusted under 35 U.S.C. 154(b) by 331 days.

(21) Appl. No.: 17/513,559

(22) Filed: Oct. 28, 2021

(65) Prior Publication Data

US 2023/0135978 A1    May 4, 2023

(51) Int. Cl.
*G06N 3/04* (2023.01)
*G06T 3/4046* (2024.01)
*G06T 7/11* (2017.01)
*G06T 7/194* (2017.01)
*G06T 9/00* (2006.01)

(52) U.S. Cl.
CPC .............. *G06T 9/002* (2013.01); *G06N 3/04* (2013.01); *G06T 3/4046* (2013.01); *G06T 7/11* (2017.01); *G06T 7/194* (2017.01)

(58) Field of Classification Search
CPC ......... G06T 9/002; G06T 3/4046; G06T 7/11; G06T 7/194; G06T 2207/20084; G06N 3/04; G06N 3/0455; G06N 3/0464; G06N 3/09; G06N 3/044; G06N 3/045
See application file for complete search history.

(56) References Cited

PUBLICATIONS

Sharma et al, AlphaNet: An Attention Guided Deep Network for Automatic Image Matting, 2020, arXiv: 2003.03613v1, pp. 1-9. (Year: 2020).*
Xu et al, Deep Image Matting, 2017, IEEE Conference on Computer Vision and Pattern Recognition, pp. 1-10. (Year: 2017).*
Lin et al, Real-Time High Resolution Background Matting, 2020, arXiv:2012.07810v1, pp. 1-16. (Year: 2020).*
(Continued)

*Primary Examiner* — John Villecco
*Assistant Examiner* — Kathleen M Broughton
(74) *Attorney, Agent, or Firm* — Keller Preece PLLC

(57) ABSTRACT

Methods, systems, and non-transitory computer readable storage media are disclosed for utilizing a transformer-based encoder-decoder neural network architecture for generating alpha mattes for digital images. Specifically, the disclosed system utilizes a transformer encoder to generate patch-based encodings from a digital image and a trimap segmentation by generating patch encodings for image patches and comparing the patch encodings to areas of the digital image. Additionally, the disclosed system generates modified patch-based encodings utilizing a plurality of neural network layers. The disclosed system also generates an alpha matte for the digital image from the patch-based encodings utilizing a decoder that includes a plurality of upsampling layers connected to a plurality of neural network layers via skip connections. In additional embodiments, the disclosed system generates the alpha matte based on additional encodings generated by a plurality of convolutional neural network layers connected to a subset of the upsampling layers via skip connections.

20 Claims, 10 Drawing Sheets

(56) References Cited

PUBLICATIONS

Rosas-Romero et al, Learning matte extraction in green screen images with MLP classifiers and the back-propagation algorithm, 2016, International Conference on Electronics, Communications and Computers, pp. 1-8. (Year: 2016).*

Yaman et al, Alpha Matte Generation from Single Input for Portrait Matting, 2021, arXiv:2106.03210v1, pp. 1-13. (Year: 2021).*

Zhang et al, Comparing and Combining MLPs and CNNs for Image Denoising, 2018, IEEE 4th International Conference on Computer and Communications, pp. 1-5. (Year: 2018).*

Gunduc, Tensor to Image: Image to Image Translation with Vision Transformers, 2021, arXiv: 2110.08037v1 pp. 1-14. (Year: 2021).*

Hou et al, Context-Aware Image Matting for Simultaneous Foreground and Alpha Estimation, 2019, arXiv: 1909.09725v2 pp. 1-10. (Year: 2019).*

Li et al, Dense Transformer Networks, 2017, arXiv:1705.08881v2, pp. 1-10. (Year: 2017).*

Liu et al, Towards Enhancing Fine-grained Details for Image Matting, 2021, arXiv:2101.09095v1, pp. 1-9. (Year: 2021).*

Zhou et al, Attention Transfer Network for Nature Image Matting, 2021, IEEE Transactions on Circuits and Systems for Video Technology 31(6): 2192-2205. (Year: 2020).*

Ning Xu, Brian Price, Scott Cohen, and Thomas Huang in "Deep Image Matting" in CVPR (2017).

Hao Lu, Yutong Dai, Chunhua Shen, and Songcen Xu in "Indices matter: Learning to index for deep image matting" in CVPR (2019).

Qiqi Hou and Feng Liu in "Context-aware image matting for simultaneous foreground and alpha estimation" in ICCV (2019).

Yaoyi Li and Hongtao Lu in "Natural image matting via guided contextual attention" in AAAI (2020).

Yutong Dai, Hao Lu, and Chunhua Shen in "Learning affinity-aware upsampling for deep image matting" in CVPR (2021).

Yanan Sun, Chi-Keung Tang, and Yu-Wing Tai in "Semantic image matting" in CVPR (2021).

Marco Forte and Francois Pitie in "F, B, Alpha matting" in CVPR (2020).

Shen, X., Tao, X., Gao, H., Zhou, C. and Jia, J., 2016, October. Deep automatic portrait matting. In European conference on computer vision (pp. 92-107). Springer, Cham.

Chen, Q., Ge, T., Xu, Y., Zhang, Z., Yang, X. and Gai, K., Oct. 2018. Semantic human matting. In Proceedings of the 26th ACM international conference on Multimedia (pp. 618-626).

Sengupta, S., Jayaram, V., Curless, B., Seitz, S.M. and Kemelmacher-Shlizerman, I., 2020. Background matting: The world is your green screen. In Proceedings of the IEEE/CVF Conference on Computer Vision and Pattern Recognition (pp. 2291-2300). Part 1.

Sengupta, S., Jayaram, V., Curless, B., Seitz, S.M. and Kemelmacher-Shlizerman, I., 2020. Background matting: The world is your green screen. In Proceedings of the IEEE/CVF Conference on Computer Vision and Pattern Recognition (pp. 2291-2300). Part 2.

Xie, Enze et al.; "SegFormer: Simple and Efficient Design for Semantic Segmentation with Transformers"; arXiv:2105.15203v2 [cs.CV] Jun. 5, 2021.

* cited by examiner

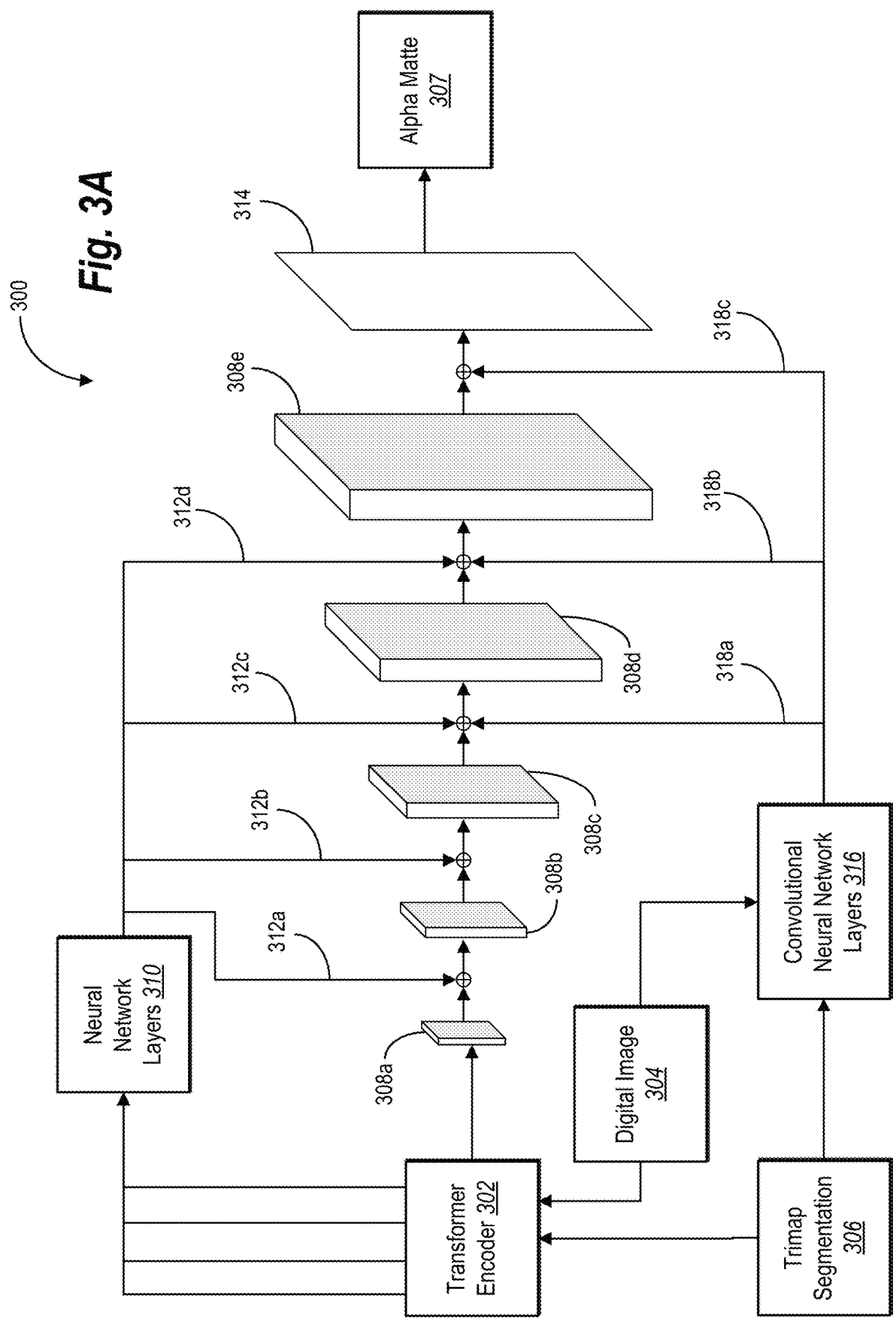

GENERATING ALPHA MATTES FOR DIGITAL IMAGES UTILIZING A TRANSFORMER-BASED ENCODER-DECODER

BACKGROUND

Improvements to computer processing technologies have led to significant advancements in the field of image processing. For example, many image processing systems detect content portrayed within digital images and manipulate the digital images in a variety of computing environments. To illustrate, these systems use image processing to generate digital image masks based on content of digital images/video, which can be used to modify digital images/video for photo editing, entertainment (e.g., movies, TV shows, video), or augmented/virtual reality environments. In particular, the systems utilize alpha mattes to selectively isolate portions of digital images (e.g., people/faces) for modifying the digital images according to the isolated portions. Despite these advancements, however, conventional systems continue to suffer from a number of shortcomings with regard to the flexibility, efficiency, and accuracy of generating alpha mattes for digital images.

SUMMARY

This disclosure describes one or more embodiments of methods, non-transitory computer readable media, and systems that solve the foregoing problems (in addition to providing other benefits) by utilizing a transformer encoder-decoder architecture within a neural network for generating alpha mattes for digital images. For example, the disclosed systems utilize a transformer encoder to generate patch-based encodings from a digital image and a trimap segmentation of the digital image. More specifically, the disclosed systems utilize the transformer encoder to incorporate global context information into the patch-based encodings by comparing patch encodings to areas of the digital image. Additionally, the disclosed systems can generate modified patch-based encodings utilizing a plurality of neural network layers (e.g., multilayer perceptrons that process the patch-based encodings). The disclosed systems also generate an alpha matte for the digital image from the patch-based encodings utilizing a decoder that includes a plurality of upsampling layers connected to a plurality of neural network layers via skip connections. In one or more additional embodiments, the disclosed systems also encode local context information from the digital image and the trimap segmentation by utilizing a plurality of convolutional neural network layers connected to a subset of the upsampling layers via additional skip connections. The disclosed systems thus utilize a transformer-based encoder-decoder architecture to accurately, efficiently, and flexibly generate alpha mattes from digital images.

BRIEF DESCRIPTION OF THE DRAWINGS

Various embodiments will be described and explained with additional specificity and detail through the use of the accompanying drawings in which:

FIGS. 3A-3C illustrate diagrams of a transformer-based encoder-decoder of the image matting system in accordance with one or more implementations;

DETAILED DESCRIPTION

Figure 1:
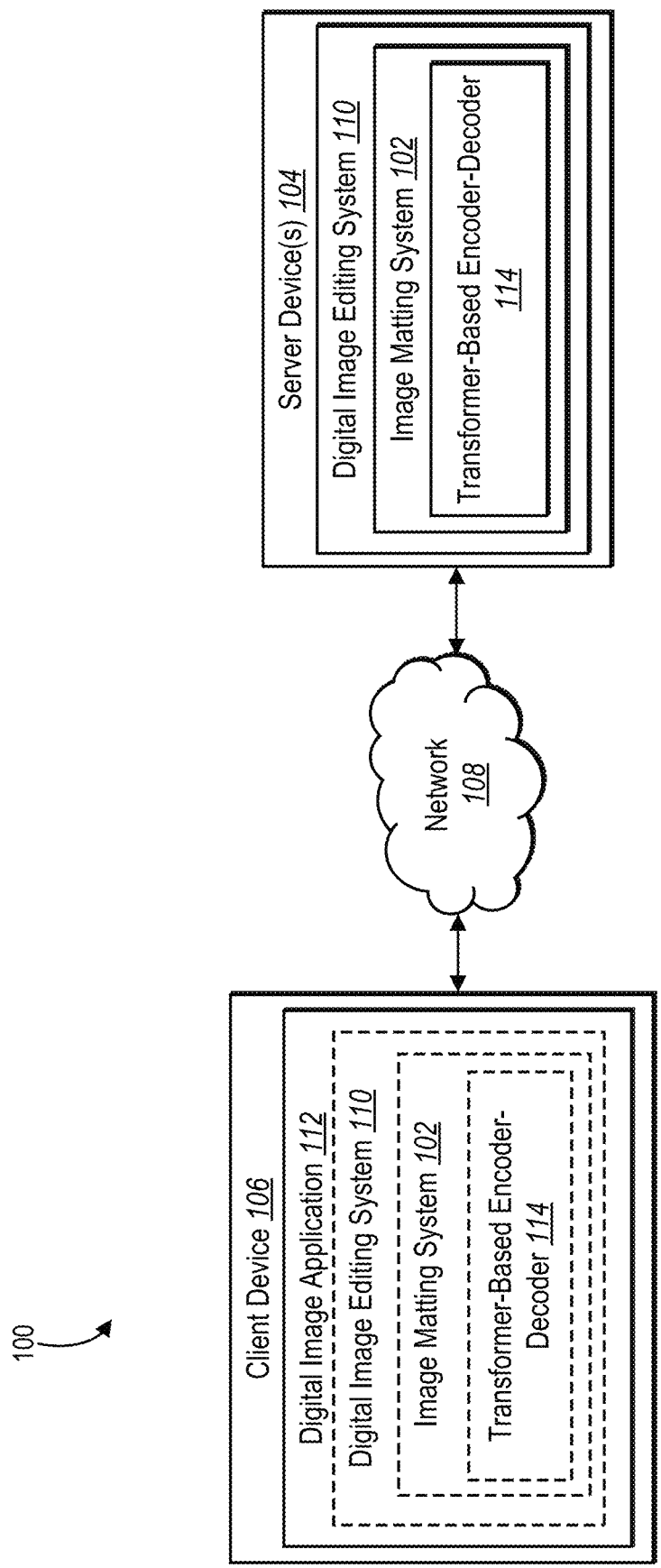
FIG. 1 illustrates an example system environment in which an image matting system can operate in accordance with one or more implementations.

This disclosure describes one or more embodiments of an image matting system that utilizes a neural network comprising a transformer encoder-decoder architecture to generate image mattes for digital images based on global and local context information. In one or more embodiments, the image matting system utilizes a transformer encoder to encode features from a digital image and a trimap segmentation of the digital image. In particular, the image matting system utilizes the transformer encoder to generate patch encodings and compare the patch encodings to areas of the digital image to leverage global context information in a plurality of patch-based encodings. The image matting system then utilizes a decoder including a plurality of neural network layers (e.g., multilayer perceptrons) connected to a plurality of upsampling layers via skip connections to generate an alpha matte for the digital image based on the patch-based encodings from the transformer encoder. In additional embodiments, the image matting system further utilizes a plurality of convolutional neural network layers connected to the upsampling layers via additional skip connections to capture local context information for generating the alpha matte.

As mentioned, in one or more embodiments, the image matting system encodes a digital image and a trimap segmentation of the digital image. For example, the image matting system generates or otherwise obtains the trimap segmentation of the digital image. The trimap segmentation includes at least one foreground region corresponding to one or more foreground objects, a background region, and a blended boundary region. In one or more embodiments, the blended boundary region includes foreground elements and background elements for the digital image.

In some embodiments, the image matting system utilizes a transformer encoder including a plurality of transformer neural network layers. Specifically, the plurality of transformer neural network layers generate patch encodings of regions of a digital image. The plurality of transformer neural network layers compare the patch encodings to other areas of the digital image to capture global context information. For example, a transformer neural network layer includes a plurality of patch encoding layers that include a self-attention layer and a feedforward neural network layer for capturing the global context information. Additionally, the image matting system utilizes the plurality of transformer neural network layers to generate patch-based encodings based on the global context information at a plurality of resolutions.

As mentioned above, the image matting system can also utilize a decoder to generate an alpha matte from a plurality of patch-based encodings. For instance, the image matting system utilizes a decoder including a plurality of upsampling layers and a plurality of neural network layers connected to the upsampling layers via skip connections. In particular, the image matting system utilizes the neural network layers to generate modified patch-based encodings. To illustrate, the neural network layers include multilayer perceptron layers that unify channel dimensions of the plurality of patch-based encodings at a plurality of different resolutions.

Furthermore, in one or more embodiments, the multilayer perceptron layers connect to the plurality of upsampling layers via skip connections. Accordingly, each multilayer perceptron connects to a different upsampling layer at a corresponding resolution. The image matting system utilizes the skip connections the incorporate the global context information from the patch-based encodings at the plurality of resolutions. To illustrate, the upsampling layers generate upsampled feature maps decoded from the patch-based encodings while incorporating the global context information at a plurality of different resolutions based on the skip connections with the multilayer perceptron layers.

In one or more additional embodiments, the image matting system utilizes an additional set of neural network layers to capture local context information. For example, the image matting system utilizes convolutional neural network layers in parallel with the transformer encoder to generate additional encodings based on the digital image and the trimap segmentation. In particular, the image matting system utilizes the convolutional neural network layers to extract local features from image patches of the digital image in a plurality of downsampling stages. Additionally, the convolutional neural network layers connect to the upsampling layers (e.g., a subset of higher resolution upsampling layers) to generate the alpha matte for the digital image further based on the local context information. Thus, in one or more embodiments, the image matting system generates the alpha matte based on global context information captured by the transformer encoder and local context information captured by the convolutional neural network layers.

As mentioned, conventional image processing systems have a number of shortcomings in relation to flexibility, efficiency, and accuracy of operation. For example, some image processing systems utilize deep learning to perform various digital image processing operations. Specifically, conventional image processing systems that utilize deep learning focus on capturing local context information when detecting objects in generating image masks or alpha mattes. While these conventional image processing systems are capable of recovering high-resolution details in regions of a digital image, the image processing systems are often unable to distinguish foreground objects from background objects in high-frequency regions, which results in generating inaccurate alpha mattes.

Additionally, conventional image processing systems that utilize deep learning to process digital images lack flexibility for handling variations in the input to the systems. For instance, some conventional systems that utilize deep neural networks are able to detect images with high accuracy for certain inputs (e.g., trimap segmentations with narrow blended/unknown boundary regions). When performing image processing operations under uncertainty (e.g., trimap segmentations with broad blended/unknown boundary regions), the accuracy of the conventional systems reduces significantly. The conventional systems are therefore unable to provide useful results in high uncertainty conditions without significant user involvement.

Furthermore, many conventional image processing systems that utilize deep neural networks to process digital images are inefficient. Specifically, many deep neural networks that perform digital image processing with object recognition have a large number of parameters. Accordingly, the conventional systems require a significant amount of computing resources to both train and implement the deep neural networks to process digital images (in addition to the processing time larger networks can require).

The disclosed image matting system provides a number of advantages over conventional systems. For instance, the image matting system improves the flexibility of computing systems that process digital images. In particular, in contrast to conventional systems that are often limited to high confidence settings, the image matting system flexibly provides image matting in both high and low confidence applications and in high and low frequency portions of digital images. By utilizing a transformer-based encoder-decoder in combination with convolutional neural network layers, the image matting system captures global context information and local context information when generating alpha mattes.

Additionally, the disclosed image matting system improves the accuracy of computing systems that perform digital image processing operations. Specifically, by utilizing an encoder-decoder architecture based on transformer neural networks, the image matting system captures global context information for accurately detecting object boundaries in digital images. The image matting system also utilizes additional encoding via a plurality of convolutional neural network layers to capture local context information including high-resolution details.

In addition to improving flexibility and accuracy, the image matting system also improves efficiency of computing devices that process digital images. For instance, the image matting system utilizes a transformer-based encoder-decoder with reduced numbers of parameters over some conventional systems while providing better accuracy. By providing a lightweight encoder-decoder architecture, the image matting system reduces computing resources required to train and implement the encoder-decoder in image matting operations, which can further reduce training and implementation time.

Turning now to the figures, FIG. 1 illustrates an embodiment of a system environment 100 in which an image matting system 102 is implemented in accordance with one or more embodiments. In particular, the system environment 100 includes server device(s) 104 and a client device 106 in communication via a network 108. Moreover, as shown, the server device(s) 104 include a digital image editing system 110, which includes the image matting system 102. Additionally, the client device 106 includes a digital image application 112, which optionally includes the digital image editing system 110 and the image matting system 102. Furthermore, as shown, the image matting system 102 includes a transformer-based encoder-decoder 114.

As shown in FIG. 1, in one or more implementations, the server device(s) 104 includes or hosts the digital image editing system 110. Specifically, the digital image editing system 110 includes, or is part of, one or more systems that implement digital image processing. For example, the digital image editing system 110 provides tools for viewing, generating, editing, and/or otherwise interacting with digital images. To illustrate, the digital image editing system 110 communicates with the client device 106 via the network 108 to provide the tools for display and interaction via the digital image application 112 at the client device 106.

Additionally, in some embodiments, the digital image editing system 110 receives data from the client device 106 in connection with editing digital images, including requests to access digital images stored at the server device(s) 104 (or at another device) and/or requests to store digital images from the client device 106 at the server device(s) 104 (or at another device). In some embodiments, the digital image editing system 110 receives interaction data for viewing, generating, or editing a digital image from the client device 106, processes the interaction data (e.g., to view, generate, or edit a digital image), and then provides the results of the interaction data to the client device 106 for display via the digital image application 112 or to a third-party system.

In one or more embodiments, a digital image includes a computer representation of visual content. For example, a digital image includes, but is not limited to, a digital photograph, a digital video frame, a computer-generated image, or a digitally scanned image. As mentioned, according to one or more embodiments, the digital image editing system 110 provides tools for generating and editing digital images. For instance, the digital image editing system 110 provides tools (e.g., via the digital image application 112 at the client device 106) for selecting, modifying, or removing objects in digital images utilizing object detection.

In one or more additional embodiments, the digital image editing system 110 utilizes the image matting system 102 to generate alpha mattes for digital images. In particular, the image matting system 102 utilizes the transformer-based encoder-decoder 114 to generate alpha mattes or other image masks based on global and local context information in the digital images. More specifically, the image matting system 102 utilizes the transformer-based encoder-decoder 114 to automatically generate an alpha matte from a digital image and a trimap segmentation of the digital image. In some embodiments, the image matting system 102 or the digital image editing system 110 also generates the trimap segmentation of the digital image (e.g., via a neural network and/or based on user inputs).

As described in more detail below, the transformer-based encoder-decoder 114 includes a transformer encoder that captures global context information from a digital image. Specifically, the transformer encoder includes a plurality of transformer neural network layers that generate patch-based encodings by comparing patch encodings corresponding to regions of the digital image to other areas of the digital image. Additionally, in one or more embodiments, the transformer-based encoder-decoder 114 includes a plurality of neural network layers (e.g., multilayer perceptrons) that unify channel dimensions from the patch-based encodings. The plurality of neural network layers provide the modified patch-based encodings to a plurality of upsampling layers at skip connections to upsample encoded features while incorporating the global context information from the multi-level features of the patch-based encodings. In further embodiments, the transformer-based encoder-decoder 114 includes a plurality of convolutional neural network layers to capture local context information to provide to the upsampling layers via additional skip connections.

In one or more embodiments, after utilizing the image matting system 102 to generate an alpha matte for a digital image utilizing the transformer-based encoder-decoder 114, the digital image editing system 110 provides the alpha matte to the client device 106 via the network 108. For instance, the digital image editing system 110 provides the alpha matte for rendering at the client device 106 on a display device using the digital image application 112. Additionally, in some embodiments, the client device 106 receives additional inputs to further modify the digital image, such as inputs to change attributes or positions of foreground or background regions or the alpha matte. The client device 106 sends data to the digital image editing system 110 for further modifying the digital image or the alpha matte (e.g., utilizing the image matting system 102) and then provides the further modified digital image/alpha matte to the client device 106 for display.

In one or more embodiments, the server device(s) 104 include a variety of computing devices, including those described below with reference to FIG. 7. For example, the server device(s) 104 includes one or more servers for storing and processing data associated with digital images. In some embodiments, the server device(s) 104 also include a plurality of computing devices in communication with each other, such as in a distributed storage environment. In some embodiments, the server device(s) 104 include a content server. The server device(s) 104 also optionally includes an application server, a communication server, a web-hosting server, a social networking server, a digital content campaign server, or a digital communication management server.

In addition, as shown in FIG. 1, the system environment 100 includes the client device 106. In one or more embodiments, the client device 106 includes, but is not limited to, a mobile device (e.g., smartphone or tablet), a laptop, a desktop, including those explained below with reference to FIG. 7. Furthermore, although not shown in FIG. 1, the client device 106 can be operated by a user (e.g., a user included in, or associated with, the system environment 100) to perform a variety of functions. In particular, the client device 106 performs functions such as, but not limited to, accessing, viewing, and interacting with a variety of digital content (e.g., digital images). In some embodiments, the client device 106 also performs functions for generating, capturing, or accessing data to provide to the digital image editing system 110 and the image matting system 102 in connection with digital images and alpha mattes. For example, the client device 106 communicates with the server device(s) 104 via the network 108 to provide information (e.g., user interactions) associated with editing digital images. Although FIG. 1 illustrates the system environment 100 with a single client device 106, in some embodiments, the system environment 100 includes a different number of client devices.

Additionally, as shown in FIG. 1, the system environment 100 includes the network 108. The network 108 enables communication between components of the system environment 100. In one or more embodiments, the network 108 may include the Internet or World Wide Web. Additionally, the network 108 can include various types of networks that use various communication technology and protocols, such as a corporate intranet, a virtual private network (VPN), a local area network (LAN), a wireless local network (WLAN), a cellular network, a wide area network (WAN), a metropolitan area network (MAN), or a combination of two or more such networks. Indeed, the server device(s) 104 and the client device 106 communicates via the network using one or more communication platforms and technologies suitable for transporting data and/or communication signals, including any known communication technologies, devices, media, and protocols supportive of data communications, examples of which are described with reference to FIG. 7.

Although FIG. 1 illustrates the server device(s) 104 and the client device 106 communicating via the network 108, in alternative embodiments, the various components of the system environment 100 communicate and/or interact via other methods (e.g., the server device(s) 104 and the client device 106 can communicate directly). Furthermore, although FIG. 1 illustrates the image matting system 102 being implemented by a particular component and/or device within the system environment 100, the image matting system 102 can be implemented, in whole or in part, by other computing devices and/or components in the system environment 100 (e.g., the client device 106).

In particular, in some implementations, the image matting system 102 on the server device(s) 104 supports the image matting system 102 on the client device 106. For instance, the image matting system 102 on the server device(s) 104 generates or trains the image matting system 102. The server device(s) 104 provides the trained image matting system to the client device 106. In other words, the client device 106 obtains (e.g., downloads) the image matting system 102 from the server device(s) 104. At this point, the client device 106 is able to utilize the image matting system 102 to generate an alpha matte for a digital image independent from the server device(s) 104.

In alternative embodiments, the image matting system 102 includes a web hosting application that allows the client device 106 to interact with content and services hosted on the server device(s) 104. To illustrate, in one or more implementations, the client device 106 accesses a web page supported by the server device(s) 104. The client device 106 provides input to the server device(s) 104 to perform digital image generation and editing operations, and, in response, the image matting system 102 or the digital image editing system 110 on the server device(s) 104 performs operations to generate and/or edit digital images. The server device(s) 104 then provide the output or results of the operations to the client device 106.

Figure 2:
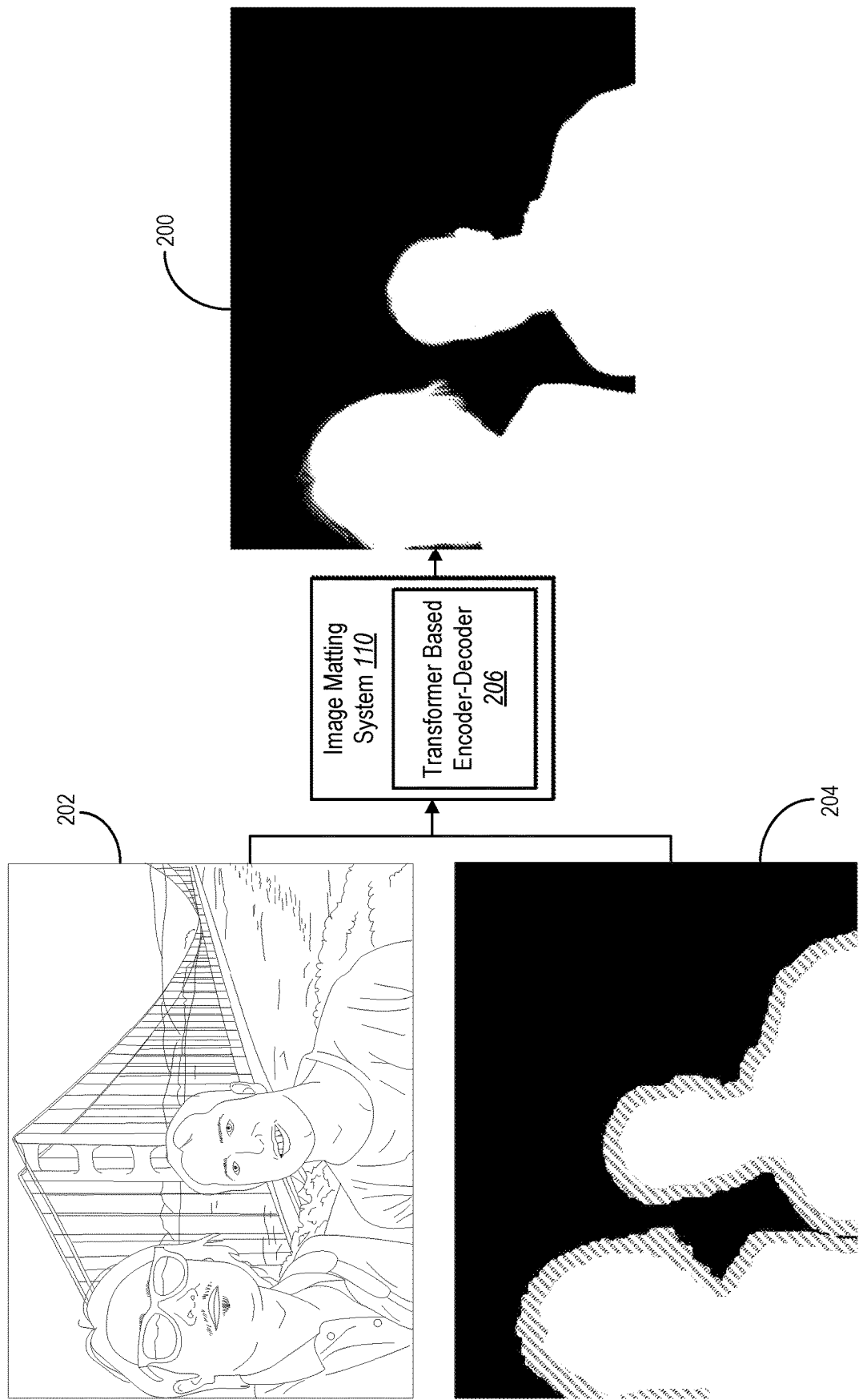
FIG. 2 illustrates a diagram of the image matting system generating an image matte for a digital image in accordance with one or more implementations.

As mentioned, the image matting system 102 can generate alpha mattes from digital images utilizing a transformer-based encoder-decoder. FIG. 2 illustrates the image matting system 102 generating an alpha matte 200 from a digital image 202 and a trimap segmentation 204 of the digital image 202. Specifically, the image matting system 102 predicts an alpha map based on one or more boundaries of one or more objects in the digital image 202 based on global context information and local context data in the digital image 202 and the trimap segmentation 204.

In one or more embodiments, the image matting system 102 utilizes a plurality of neural network layers in an encoder and a decoder to generate the alpha matte 200 from the digital image 202 and the trimap segmentation. A neural network includes a computer algorithm that is tuned (e.g., trained) based on inputs to approximate unknown functions. For instance, a neural network includes one or more layers or artificial neurons that approximate unknown functions by analyzing known data at different levels of abstraction. In some embodiments, a neural network includes one or more neural network layers including, but not limited to, a deep learning model, a convolutional neural network, a recurrent neural network, a transformer neural network, a self-attention neural network, a feed forward neural network, or a multilayer perceptron. In one or more embodiments, a neural network includes, but is not limited to, a plurality of neural network layers to determining features of a digital image for detecting object boundaries between foreground and background regions and generating alpha mattes for digital images.

In one or more embodiments, the image matting system 102 determines the trimap segmentation 204 for the digital image 202. According to one or more embodiments, a trimap segmentation includes a partition of a digital image into a foreground region, a background region, and a blended boundary region. In particular, a trimap segmentation includes a plurality of pixels associated with a defined foreground region that corresponds to a portion of the digital image portraying one or more objects, a plurality of pixels associated with a defined background region corresponding to a portion of the digital image outside the one or more objects, and a plurality of pixels associated with a portion of the digital image that includes both foreground and background elements (e.g., at fuzzy or mixed boundaries between foreground objects such as hair and background scenes). Thus, a trimap segmentation includes a visualization of each region using different colors or display values such as black (e.g., for a background region), white (e.g., for a foreground region), and gray (e.g., for a blended boundary region). In one or more embodiments, a trimap segmentation includes a representation of a blended boundary region separate from a representation of a foreground region and a background region. For instance, a trimap segmentation alternatively includes a representation of the blended boundary region separate from an initial mask including foreground and background regions. Additionally, in one or more embodiments, a trimap segmentation is based on an initial mask, such that the image matting system 102 first determines the initial mask and then determines the trimap segmentation 204.

For instance, the trimap segmentation 204 provides a guide to the image matting system 102 for determining specific object boundaries from the digital image 202. To illustrate, the trimap segmentation 204 indicates one or more foreground regions corresponding to one or more objects and one or more background regions corresponding to a background scene along with the blended boundary region including both foreground and background elements. The image matting system 102 thus determines features (e.g., one or more feature vectors or feature maps) according to the indicated boundary regions of the digital image 202.

In one or more embodiments, the image matting system 102 generates the trimap segmentation 204 utilizing an automated process such as a trimap generation neural network to generate the trimap segmentation 204 from the digital image 202. To illustrate, the image matting system 102 utilizes the trimap generation neural network as described in AUTOMATICALLY GENERATING A TRIMAP SEGMENTATION FOR A DIGITAL IMAGE BY UTILIZING A TRIMAP GENERATION NEURAL NETWORK, U.S. application Ser. No. 16/988,036 filed Aug. 7, 2020 to Zhang et al. (hereinafter "Zhang"), which is herein incorporated by reference in its entirety. Specifically, the trimap generation neural network in Zhang estimates foreground/background regions of a digital image by determining portions of a downsampled digital image that belong to the foreground/background regions with high confidence. The trimap generation neural network then generates a predicted blended boundary region by predicting one or more portions of the downsampled digital image that include both foreground and background elements (e.g., based on visual information such as colors and objects).

In alternative embodiments, the image matting system 102 determines the trimap segmentation 204 based on user input. For instance, the image matting system 102 provides tools for a user to manually generate and/or edit (e.g., via a digital image application) a trimap segmentation by marking portions of a background region, portions of a foreground region, and/or portions of a blended boundary region. In additional embodiments, the image matting system 102 generates the trimap segmentation 204 (e.g., utilizing a neural network) and then provides the trimap segmentation 204 to a client device of a user for refinement of one or more regions of the trimap segmentation 204 by a user. In further embodiments, the image matting system 102 provides the digital image 202 to a third-party system to determine the trimap segmentation 204.

After determining the trimap segmentation 204 for the digital image 202, the image matting system 102 utilizes a transformer-based encoder-decoder 206 to generate the alpha matte 200. In particular, the image matting system 102 provides the digital image 202 and the trimap segmentation 204 to the transformer-based encoder-decoder 206. The transformer-based encoder-decoder 206 generates the alpha matte 200 by predicting/refining the object boundaries according to the digital image 202 and the trimap segmentation 204.

According to one or more embodiments, an alpha matte includes an image layer that includes transparency values based on content in a digital image. For instance, an alpha matte includes first values for pixels indicating foreground regions of a digital image and second values for pixels indicating background regions of the digital image. Furthermore, an alpha matte includes alpha values (e.g., values between the first and second values) indicating regions with transparency. To illustrate, an alpha matte includes a value of 0 (e.g., black) indicating a pixel with full transparency, a value of 1 (e.g., white) indicating a pixel with full opacity, and values between 0 and 1 indicating partial transparency. In other embodiments, the image matting system 102 utilizes another scale to indicate transparency of pixel values such as percentages (e.g., 0%-100%) or color scale values (e.g., 0-255).

As illustrated in FIG. 2, in one or more embodiments, the image matting system 102 generates the alpha matte 200 to isolate one or more objects from the digital image 202 in an image mask or in a separate layer from the digital image 202. For example, the image matting system 102 detects and isolates one or more foreground objects (e.g., the people of FIG. 2) from background objects. To illustrate, by leveraging the information in the trimap segmentation 204 along with the digital image 202, the image matting system 102 determines boundaries between the people in the digital image 202 and background objects (e.g., the background scene including objects).

Figure 3B:
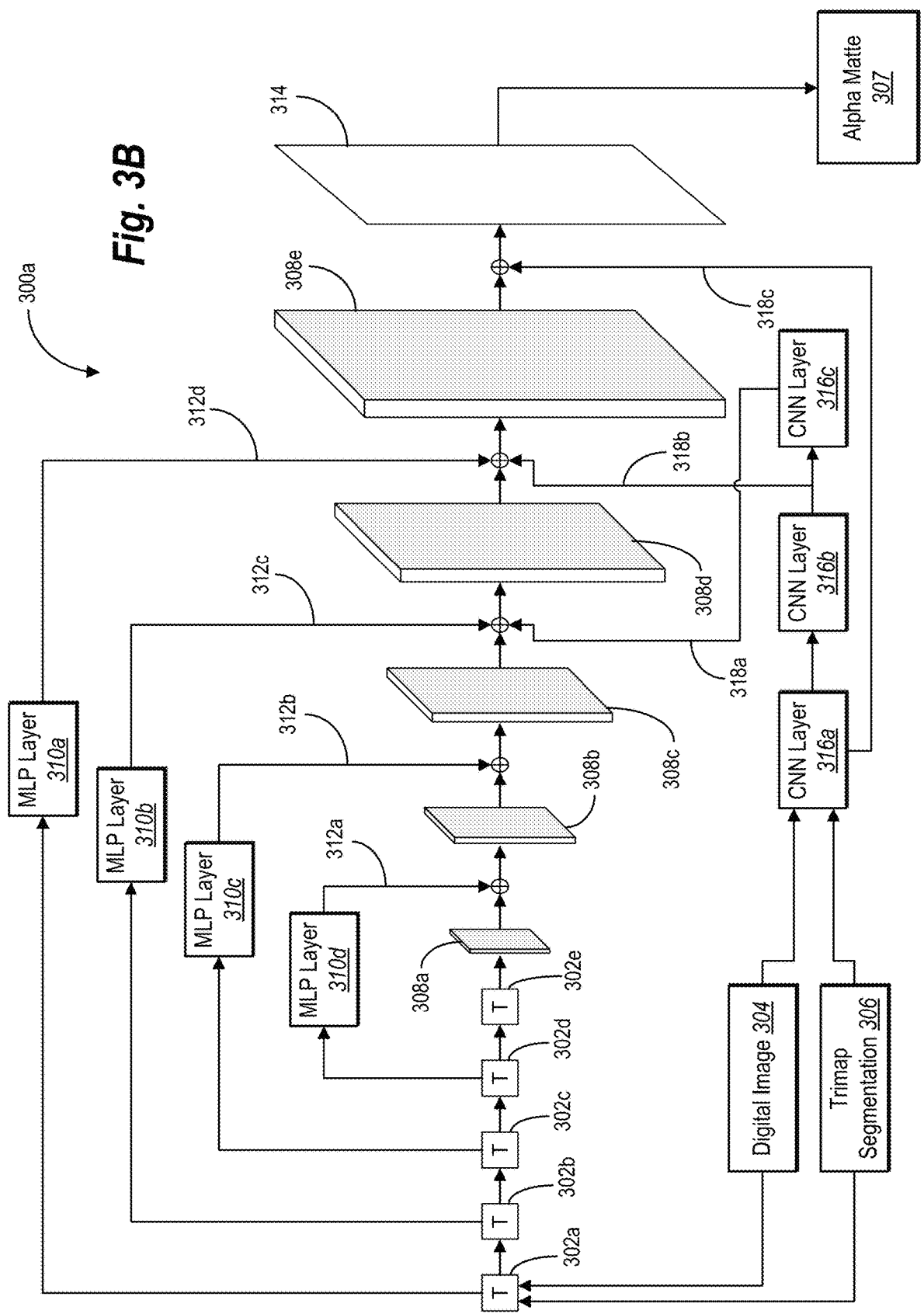
Figure 3C:
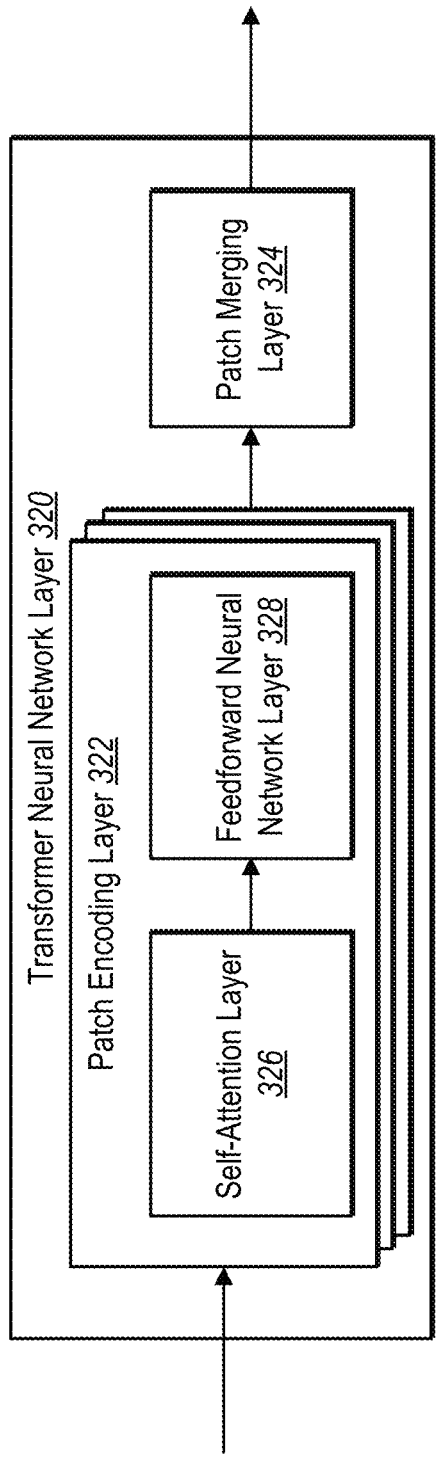

FIGS. 3A-3C illustrate embodiments of architectures of a transformer-based encoder-decoder 300 that the image matting system 102 utilizes to generate alpha mattes for digital images. Specifically, FIG. 3A illustrates an overview diagram of the architecture of the transformer-based encoder-decoder 300. Additionally, FIG. 3B illustrates a more detailed diagram of the architecture of the transformer-based encoder-decoder 300. FIG. 3C illustrates an embodiment of an architecture of a transformer neural network layer as part of the transformer-based encoder-decoder 300.

As mentioned, FIG. 3A illustrates an embodiment of an architecture of the transformer-based encoder-decoder 300. In particular, the transformer-based encoder-decoder 300 includes a transformer encoder 302 to encode multi-level features of a digital image 304 in connection with a trimap segmentation 306 of the digital image 304 while capturing global context information in the encoded features. Additionally, the transformer-based encoder-decoder 300 includes a decoder to decode and upsample the multi-level features while retaining the global context information.

Furthermore, the transformer-based encoder-decoder 300 generates an alpha matte 307 based on the output of the decoder.

In one or more embodiments, the transformer encoder 302 generates a plurality of patch-based encodings including multi-level features of a digital image 304. For example, the transformer encoder 302 captures global context information from the digital image 304 by encoding patches of the digital image 304 and then comparing the encodings to other areas of the digital image 304. According to one or more embodiments, global context information includes visual information that informs understanding of visual information in other areas of a digital image. To illustrate, the image matting system 102 utilizes global context information to determine object boundaries in localized areas based on objects and object boundaries in other areas of a digital image. The global context information thus allows the image matting system 102 to differentiate between foreground objects and background objects in blended boundary regions with high uncertainty between the foreground and background object boundaries.

As illustrated in FIG. 3A, the transformer-based encoder-decoder 300 includes a decoder to decode and upsample the multi-level features encoded by the transformer encoder 302. For example, the decoder includes a plurality of upsampling layers 308a-308e following the transformer encoder 302 to upsample the output of the transformer encoder 302 in a plurality of stages. In one or more embodiments, each upsampling layer includes a neural network layer (e.g., a convolutional neural network layer) to upsample features at each stage of the decoder. Specifically, a first upsampling layer 308a upsamples an output of the transformer encoder 302, and each subsequent upsampling layer upsamples features from the previous upsampling layer.

Furthermore, in one or more embodiments, the decoder includes a plurality of neural network layers 310. In particular, the neural network layers 310 receive the patch-based encodings including multi-level features at a plurality of different resolutions from the transformer encoder 302. For instance, the neural network layers 310 generates modified patch-based encodings from the patch-based encodings from the transformer encoder 302. According to one or more embodiments, the neural network layers 310 include multi-layer perceptron layers to modify and pass through the patch-based encodings. In alternative embodiments, the neural network layers 310 include another type of feedforward neural network layer to modify the patch-based encodings.

As illustrated in FIG. 3A, the neural network layers 310 connect to the upsampling layers 308a-308e via a plurality of skip connections 312a-312d. By connecting the neural network layers 310 to the upsampling layers 308a-308e via the skip connections, the image matting system 102 retains multi-level features across the upsampling stages. For example, the image matting system 102 utilizes the neural network layers 310 to unify channel dimensions of the multi-level features from the digital image 304 by combining the modified patch-based encodings with the output of the previous upsampling layer at each upsampling stage (e.g., via concatenation). Accordingly, each upsampling layer after a skip connection (e.g., upsampling layers 308b-308d) generates an upsampled feature map based on the upsampled feature map from the previous upsampling layer in combination with a corresponding modified patch-based encoding from a neural network layer at a skip connection (e.g., by concatenating the upsampled feature map from the previous upsampling layer with the modified patch-based encoding).

FIG. 3A illustrates that the decoder also includes a final layer 314 for generating the alpha matte 316 from the upsampled feature maps generated by the upsampling layers 308a-308e. To illustrate, the final layer 314 includes a regression function for determining the final values of the pixels in the alpha matte 316 (including alpha values) according to a transparency scale for generating the alpha matte 316. In alternative embodiments, the final layer 314 includes another type of activation function such as a sigmoid activation for generating binary image masks.

In addition to capturing global context information utilizing the transformer encoder 302 and the neural network layers 310 connected to the upsampling layers 308a-308e via the skip connections 312a-312e, in one or more embodiments, the image matting system 102 also utilizes convolutional neural network layers 316 to capture local context information in the digital image 304. Specifically, the local context information includes high resolution details of localized areas of a digital image. In particular, the convolutional neural network layers 316 encode local features of portions of the digital image 304 by processing the individual portions of the digital image 304 in connection with the trimap segmentation 306.

In one or more embodiments, as illustrated in FIG. 3A, the image matting system 102 also connects the convolutional layers 316 to a subset of the upsampling layers 308a-308e via additional skip connections 318a-318c. For instance, the image matting system 102 connects the convolutional neural network layers 316 to a subset of upsampling layers later on in the upsampling process when the upsampled features are more detailed (e.g., at a specific resolution). To illustrate, the convolutional neural network layers 316 connect to the final two upsampling layers (e.g., upsampling layer 308d and upsampling layer 308e) via skip connections 318a-318b. In additional embodiments, the image matting system 102 includes an additional skip connection 318c after the final upsampling layer (e.g., upsampling layer 308e) and prior to the final layer 314 for providing captured local context information at the final resolution of the alpha matte 307.

As shown in FIG. 3A, in one or more embodiments, the image matting system 102 leverages the transformer-based encoder-decoder 300 to capture both global and local context information from digital images when generating alpha mattes. In particular, by utilizing the transformer encoder 302 as a backbone for the transformer-based encoder-decoder 300, the image matting system 102 captures global context information from the digital image 304 to more accurately distinguish foreground objects in uncertain boundary regions. Additionally, by utilizing the convolutional neural network layers 316 in parallel with the transformer encoder 302, the image matting system 102 captures local context information from the digital image 304 to provide high resolution detail in the detected boundary regions.

FIG. 3B illustrates additional detail of an embodiment of a transformer-based encoder-decoder 300a. Specifically, the transformer-based encoder-decoder 300a includes a hierarchical transformer encoder with a plurality of transformer neural network layers 302a-302e. In one or more embodiments, each transformer neural network layer generates a patch-based encoding that captures global context information based on the input to the corresponding layer. According to one or more embodiments, the image matting system 102 utilizes a plurality of transformer neural network layers with a plurality of different processing strides (e.g., 4, 8, 15, 32) to capture different levels of detail in the encoded features.

For example, a first transformer neural network layer 302a generates a first patch-based encoding based on the digital image 304 and the trimap segmentation 306. To illustrate, the image matting system 102 concatenates the digital image 304 and the trimap segmentation 306 (e.g., concatenates embeddings or feature vectors) for providing to the first transformer neural network layer 302a. The first transformer neural network layer 302a provides the first patch-based encoding to a second transformer neural network layer 302b, which then generates a second patch-based encoding downsampled from the first patch-based encoding. Similarly, each transformer neural network layer generates a downsampled patch-based encoding until the final transformer neural network layer 302e, which generates a final downsampled patch-based encoding and provides the final patch-based encoding to the upsampling layers 308a-308e.

In addition to providing the patch-based encodings to the subsequent transformer neural network layer, FIG. 3B illustrates that some of the transformer neural network layers provide the patch-based encodings to a plurality of multi-layer perceptron layers ("MLP layers 310a-310d"). Specifically, as shown, in a transformer encoder including five separate transformer neural network layers, the first four transformer neural network layers (i.e., all but the final transformer neural network layer) provide the patch-based encodings to corresponding MLP layers 310a-310d. To illustrate, the first transformer neural network layer 302a provides a first patch-based encoding to a first MLP layer 310a, the second transformer neural network layer 302b provides a second patch-based encoding to a second MLP layer 310b, a third transformer neural network layer 302c provides a third patch-based encoding to a third MLP layer 310c, and a fourth transformer neural network layer 302d provides a fourth patch-based encoding to a fourth MLP layer 310d. As further illustrated, the final transformer neural network layer 302e provides the final patch-based encoding directly to the first upsampling layer 308a.

In one or more embodiments, the MLP layers 310a-310d generate modified patch-based encodings from the patch-based encodings. According to one or more embodiments, a modified patch-based encoding includes a feature set that a neural network has modified to unify channel dimensions of the feature sets for the upsampling layers. To illustrate, the MLP layers 310a-310d provide the modified patch-based encodings to the upsampling layers at corresponding resolutions via the skip connections 312a-312d. For example, the fourth MLP layer 310d generates a modified patch-based encoding based on the fourth patch-based encoding and provides the modified patch-based encoding to a second upsampling layer 308b via a first skip connection 312a. The other MLP layers 310a-310c generate corresponding modified patch-based encodings to provide to the corresponding upsampling layers 308c-308e via the corresponding skip connections 312b-312d. Furthermore, each MLP layer provides a modified patch-based encoding to the upsampling layer based on the resolution of the input to the upsampling layer (i.e., the same resolution as an upsampled feature map from the previous upsampling layer).

In one or more additional embodiments, as illustrated in FIG. 3B, the transformer-based encoder-decoder 300a includes a plurality of convolutional neural network layers ("CNN layers 316a-316c) in parallel with the transformer neural network layers 302a-302e and MLP layers 310a-310d. In particular, FIG. 3B illustrates that the transformer-based encoder-decoder 300a includes the CNN layers 316a-316c in series to successively encode features from the digital image 304 and the trimap segmentation 306. More specifically, as previously described, the CNN layers 316a-316c capture local context information from the digital image 304 and the trimap segmentation 306 for generating the alpha matte 307. According to one or more embodiments, the image matting system 102 utilizes a plurality of convolutional neural network layers with a plurality of different processing strides (e.g., 1, 2, 4, 8) to capture different levels of detail in the encoded features. Furthermore, in one or more embodiments, the image matting system 102 concatenates skipped feature sets to corresponding layers in the decoder.

To illustrate, a first CNN layer 316a generates a first feature set from the digital image 304 and the trimap segmentation 306. For instance, the first CNN layer 316a generates the first feature set by encoding local features from small patches (e.g., 3×3 patches). As shown, the first CNN layer 316a is connected via skip connection 318c after the final upsampling layer 308e and before the final layer 314. Because the first CNN layer 316a is connected after the final upsampling layer 308e, the first CNN layer 316a does not downsample the encoded features. Furthermore, the first CNN layer 316a feeds into a second CNN layer 316b by providing the first feature set to the second CNN layer 316b.

In one or more embodiments, the second CNN layer 316b further encodes the first feature set from the first CNN layer 316a by downsampling the first feature set and then encoding the local features in patches. Thus, the second CNN layer 316b generates a second feature set at a first downsampled resolution. Additionally, the second CNN layer 316b provides the second feature set to the input of the final upsampling layer 308e via skip connection 318b at the first downsampled resolution. The second CNN layer 316b further provides the second feature set to a third CNN layer 316c.

In one or more embodiments, the third CNN layer 316c encodes the second feature set from the second CNN layer 316b by downsampling the second feature set to a second downsampled resolution and then encodes the local features of the downsampled features in patches. The third CNN layer 316c generates a third feature set at the second downsampled resolution and provides the third feature set to the input of the upsampling layer (e.g., upsampling layer 308d) before the final upsampling layer 308e via skip connection 318a. In the embodiment of FIG. 3B, the third CNN layer 316c represents the final CNN layer for capturing local context information. In alternative embodiments, the image matting system 102 utilizes more or fewer CNN layers for capturing contextual information and connecting the CNN layers to the upsampling stages at the corresponding resolutions.

By generating feature sets based on local context information at a plurality of resolutions and inserting the feature sets at later stages of the upsampling layers, the image matting system 102 is able to recover detailed local information from the digital image (e.g., more detailed/accurate boundaries). Specifically, because the transformer encoder is focused on capturing global context information, the transformer encoder may miss certain local features. Accordingly, the combination of the features from the transformer encoder (with neural network layers and skip connections across a plurality of stages of the upsampling stages) and the features from the convolutional neural network layers (with skip connections at higher resolutions) leverages both global context information and local context information to generate accurate alpha mattes.

Although FIG. 3B illustrates a specific number of transformer neural network layers, multilayer perceptron layers, convolutional neural network layers, and upsampling layers, the image matting system 102 can use a transformer-based encoder-decoder with any number of each type of layer. For example, the transformer-based encoder-decoder includes more or fewer upsampling layers than shown in FIG. 3B. Based on having more or fewer upsampling layers, the transformer-based encoder-decoder includes more or fewer transformer neural network layers, multilayer perceptron layers, and/or convolutional neural network layers.

Furthermore, while FIGS. 3A-3B illustrate embodiments of a transformer-based encoder-decoder including convolutional neural network layers to capture local context information, in some embodiments, the image matting system 102 utilizes a transformer-based encoder-decoder without the convolutional neural network layers. For example, the transformer-based encoder-decoder includes a transformer encoder and neural network layers connected to upsampling layers via skip connections without the convolutional neural network layers and additional skip connections. In such embodiments, the image matting system 102 utilizes the transformer encoder to capture both global context information and local context information.

As mentioned, FIG. 3C illustrates an architecture of a transformer neural network layer 320 of a transformer encoder (e.g., the transformer encoder 302). Specifically, the transformer encoder includes a hierarchical structure of transformer neural network layers in series to successively downsample and encode features based on global context information from a digital image and a trimap segmentation. In one or more embodiments, the transformer neural network layer 320 includes a plurality of patch encoding layers 322 to generate a plurality of patch encodings based on the digital image and the trimap segmentation. Furthermore, the transformer neural network layer 320 includes a patch merging layer 324 to merge patch encodings into a patch-based encoding for the transformer neural network layer 320. By including a plurality of transformer neural network layers in a transformer encoder, the image matting system 102 thus generates a plurality of patch-based encodings at a plurality of resolutions.

As illustrated in FIG. 3C, each patch encoding layer of the plurality of patch encoding layers 322 includes a self-attention layer 326 and a feedforward neural network layer 328. According to one or more embodiments, each patch encoding layer generates patch encodings for image patches (or regions) of a digital image based on the contents of the image patches (or based on contents of portions of feature sets extracted from the digital image). Specifically, the patch encoding layer utilizes the self-attention layer 326 to compare a plurality of patch encodings for a plurality of image patches to other areas of the digital image to generate encodings for the image patches. For instance, the self-attention layer 326 compares a patch encoding for an image patch to other patch encodings of the digital image to encode global information from the digital image into the encoding corresponding to the image patch. Thus, the self-attention layer 326 extracts more accurate features from individual patches by pulling information from other parts of the digital image into each individual patch encoding.

As illustrated, each patch encoding layer of the patch encoding layers 322 includes the feedforward neural network layer 328 following the self-attention layer 326. In one or more embodiments, the feedforward neural network layer 328 includes one or more convolutional neural network layers that incorporates positional information for encoding image patches based on global context information. For instance, the feedforward neural network layer 328 retains the position for each patch encoding so that the global context information is accurately encoded into patch-based encodings across a plurality of transformer neural network layers. In some embodiments, the feedforward neural network layer 328 also includes one or more multilayer perceptron layers in addition to one or more convolutional neural network layers.

FIG. 3C illustrates that the transformer neural network layer 320 also includes the patch merging layer 324 following the plurality of patch encoding layers 322. In one or more embodiments, the patch merging layer 324 includes an overlapping patch merging layer that performs overlapping patch merging to produce features with a particular size for a plurality of patches based on the corresponding patch encodings generated by the patch encoding layers 322 while preserving local continuity around image patches. To illustrate, the patch merging layer 324 unifies features into a vector to obtain hierarchical feature sets for a plurality of resolutions during downsampling of a particular feature set. The transformer neural network layer 320 thus utilizes the patch merging layer 324 to generate a patch-based encoding for a digital image at a particular resolution. In one or more alternative embodiments, the image matting system 102 utilizes non-overlapping patch merging to generate patch-based encodings.

Although FIG. 3C illustrates a particular architecture for a transformer neural network layer, the image matting system 102 can use other transformer neural network architectures. For instance, the image matting system 102 can use any transformer neural network layer that generates patch-based encodings based on global context information in a digital image. To illustrate, the transformer neural network layer generates patch encodings for image patches by comparing portions of a digital image to other portions of the digital image.

In one or more embodiments, the image matting system 102 utilizes pre-trained neural network layers for the transformer-based encoder-decoder. In some embodiments, the image matting system 102 further tunes or trains the parameters of the neural network layers on a training dataset of digital images. For example, the image matting system 102 determines the training dataset including a plurality of digital images by generating digital images including a known background region and a known foreground region. The image matting system 102 utilizes the transformer-based encoder-decoder to generate an alpha matte for a digital image and then utilizes the generated alpha matte to recreate an original digital image (i.e., a ground-truth digital image) including the foreground object(s) in the alpha matte (e.g., based on the alpha values generated by the transformer-based encoder-decoder).

Furthermore, the image matting system 102 determines a compositional loss based on a difference between the original digital image and the recreated digital image. In some embodiments, the image matting system 102 also utilizes an L1 loss with the compositional loss to determine the similarity of the original digital image and the recreated digital image. The image matting system 102 utilizes the compositional loss (and/or L1 loss) to learn parameters of the neural networks of the transformer-based encoder-decoder. Additionally, in one or more embodiments, the image matting system 102 utilizes layer normalization to train the transformer encoder and batch normalization for the convolutional neural network layers.

Experimenters have conducted several evaluations (hereinafter, "the evaluation") of embodiments of the image matting system 102 relative to existing systems for generating alpha mattes for a dataset of images with trimap segmentations. Specifically, experimenters evaluated different performance metrics for determining the accuracy of the alpha mattes. For example, the experimenters determined a sum of absolute differences ("SAD"), mean squared error ("MSE"), gradient ("Grad"), and connectivity ("Conn"). Table 1 below illustrates the results for a plurality of conventional systems and a plurality of embodiments of the image matting system 102 with different numbers of training iterations ("System 102-120$k$" and "System 102-200$k$"). Table 1 also illustrates the number of parameters for each encoder-decoder. In particular, in the evaluation, the experimenters generated inputs for training on-the-fly with data augmentations (e.g., random affine, jitter, cropping, and composition). Additionally, the experimenters randomly dilated the trimap generations from the alpha matte ground truths.

| Method | Parameters | SAD | MSE | Grad | Conn |
| --- | --- | --- | --- | --- | --- |
| DIM | 130.55M | 50.4 | 0.014 | 31.0 | 50.8 |
| IndexNet | 8.15M | 45.8 | 0.013 | 25.9 | 43.7 |
| CA | 107.5M | 35.8 | 0.0082 | 17.3 | 33.2 |
| GCA | 25.27M | 35.28 | 0.0091 | 16.9 | 32.5 |
| $A^2U$ | 8.09M | 32.15 | 0.0082 | 16.39 | 29.25 |
| SIM | ~35M | 28.0 | 0.0058 | 10.8 | 24.8 |
| FBA | 34.69M | 26.4 | 0.0054 | 10.6 | 21.5 |
| System 102-120k | 29.24M | 22.66 | 0.0038 | 8.37 | 17.51 |
| System 102-200k | 29.24M | 21.77 | 0.0035 | 7.74 | 16.46 |

In particular, "DIM" refers to a system as described by Ning Xu, Brian Price, Scott Cohen, and Thomas Huang in "Deep Image Matting" in CVPR (2017). "IndexNet" refers to a system as described by Hao Lu, Yutong Dai, Chunhua Shen, and Songcen Xu in "Indices matter: Learning to index for deep image matting" in CVPR (2019). "CA" refers to a system as described by Qiqi Hou and Feng Liu in "Context-aware image matting for simultaneous foreground and alpha estimation" in ICCV (2019). "GCA" refers to a system as described by Yaoyi Li and Hongtao Lu in "Natural image matting via guided contextual attention" in AAAI (2020). "$A^2U$" refers to a system as described by Yutong Dai, Hao Lu, and Chunhua Shen in "Learning affinity-aware upsampling for deep image matting" in CVPR (2021). Additionally, "SIM" refers to a system as described by Yanan Sun, Chi-Keung Tang, and Yu-Wing Tai in "Semantic image matting" in CVPR (2021). "FBA" refers to a system as described by Marco Forte and Francois Pitie in "F, B, Alpha matting" in CVPR (2020).

As shown in Table 1 above, the image matting system 102 provides improved performance over the conventional systems on all metrics. Additionally, the image matting system 102 trains a transformer-based encoder-decoder with a simple architecture utilizing an L1 loss and a compositional loss with optimization on a dataset of images. Furthermore, the image matting system 102 utilizes a transformer-based encoder-decoder with fewer parameters than conventional systems that utilize a residual neural network architecture (e.g., SIM). Furthermore, the image matting system 102 performs better than conventional systems for trimap segmentations having different sizes of blended boundary regions. Additionally, training the transformer-based encoder-decoder with additional iterations further improves the performance of the image matting system 102.

Figure 4A:
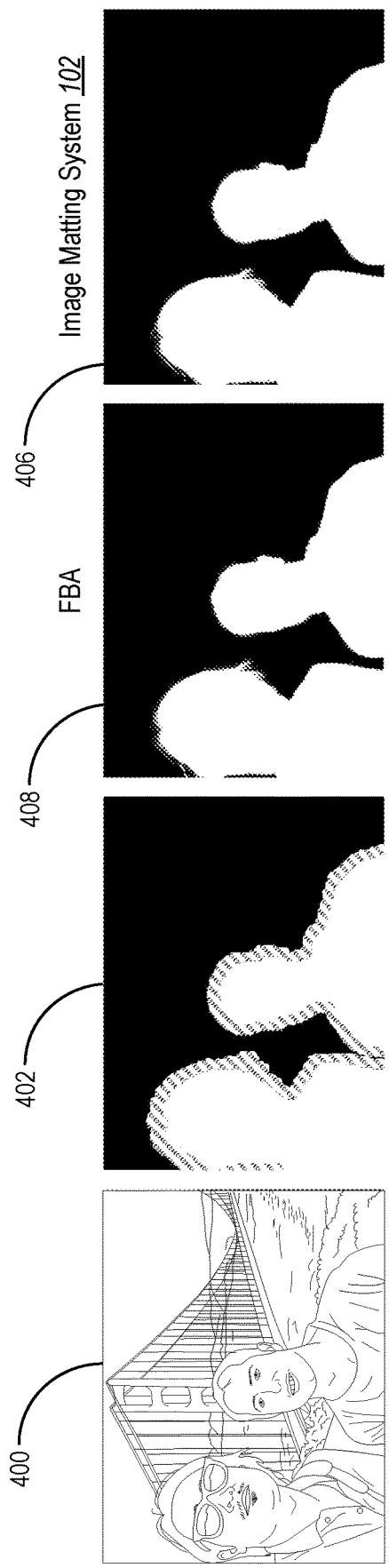
FIGS. 4A-4B illustrate comparisons of alpha mattes generated utilizing the image matting system and a conventional image editing system in accordance with one or more implementations.
Figure 4B:
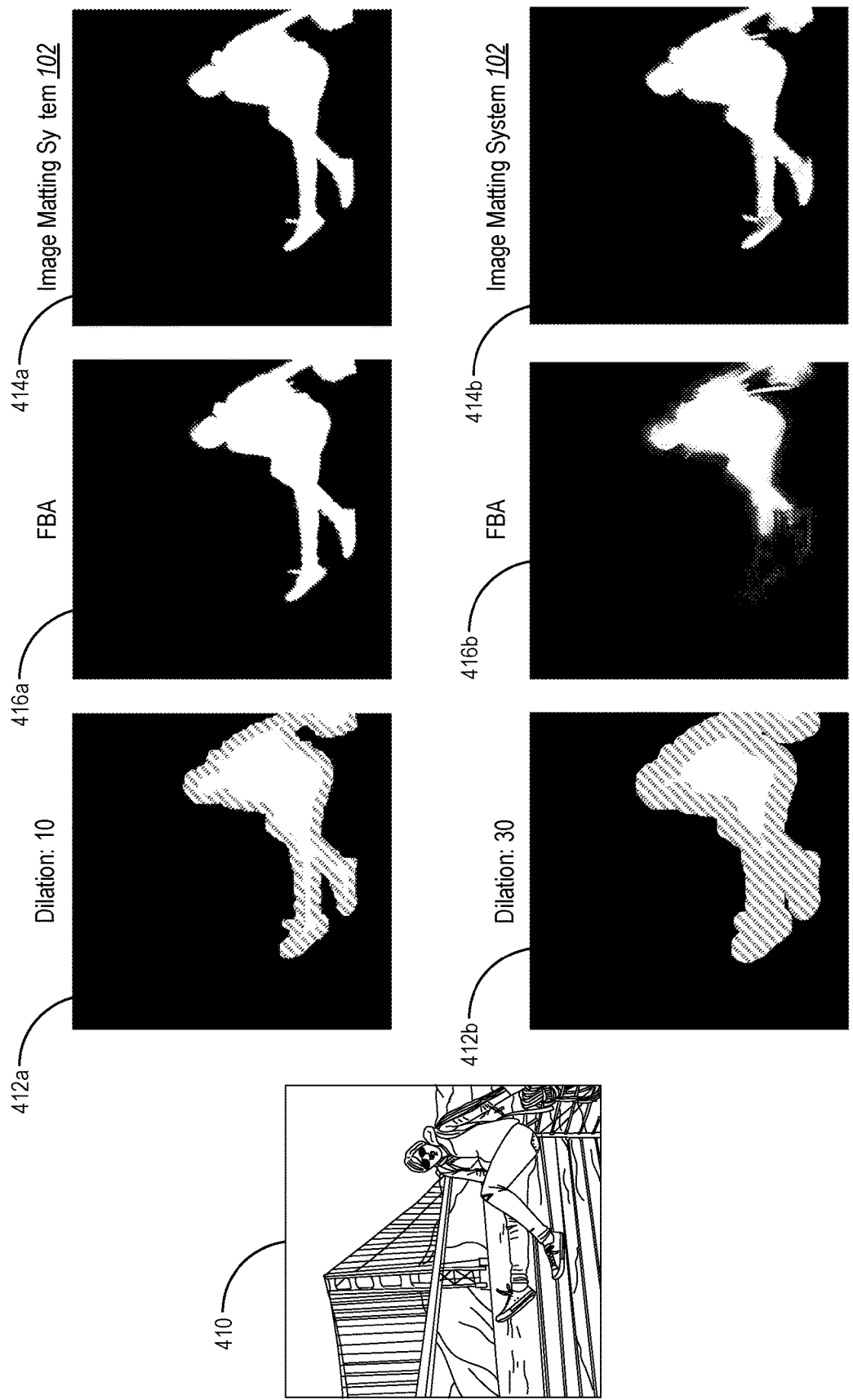

FIGS. 4A-4B illustrate comparisons of the performance of the image matting system 102 with a conventional system (FBA). In particular, FIG. 4A illustrates a digital image 400 and a trimap segmentation 402 for the digital image 400. In particular, the image matting system 102 generates an alpha matte 406 from the digital image 400 and trimap segmentation 402. The conventional system generates a conventional alpha matte 408 from the digital image 400 and trimap segmentation 402. As illustrated, the conventional system inaccurately identifies portions of the bridge suspension at the left edge of the image as being part of a person's hair. In contrast, the image matting system 102 correctly determines that the bridge suspension is not part of the person's hair based on the global context information provided by the rest of the digital image.

FIG. 4B illustrates a comparison of alpha mattes generated by the image matting system 102 relative to the conventional system for a plurality of different trimap segmentations. Specifically, FIG. 4B illustrates a digital image 410, a first trimap segmentation 412a with a first dilation value from ground truth, and a second trimap segmentation 412b with a second dilation value from ground truth. Furthermore, the image matting system 102 generates a first alpha matte 414a based on the first trimap segmentation 412a and a second alpha matte 414b based on the second trimap segmentation 412b. Additionally, the conventional system generates a first conventional alpha matte 416a based on the first trimap segmentation 412a and a second conventional alpha matte 416b based on the second trimap segmentations 412b.

As shown, the first conventional alpha matte 416a generated by the conventional system at the first dilation value includes similar accuracy to the alpha matte 414a generated by the image matting system 102. The second conventional alpha matte 416b generated by the conventional system at the second dilation value, however, is significantly less accurate than the second alpha matte 414b generated by the image matting system 102. Accordingly, FIG. 4B illustrates that the image matting system 102 provides improved performance over the conventional systems in lower confidence settings (e.g., with larger blended boundary regions of trimap segmentations).

Figure 5:
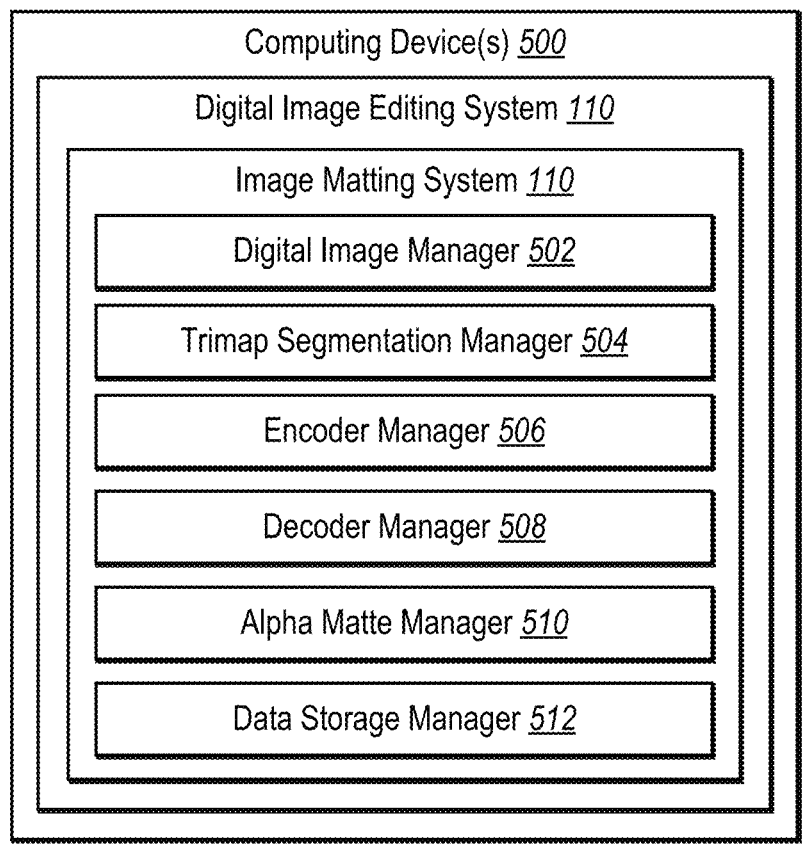
FIG. 5 illustrates a diagram of the image matting system of FIG. 1 in accordance with one or more implementations.

FIG. 5 illustrates a detailed schematic diagram of an embodiment of the image matting system 102 described above. As shown, the image matting system 102 is implemented in a digital image editing system 110 on computing device(s) 500 (e.g., a client device and/or server device as described in FIG. 1, and as further described below in relation to FIG. 7). Additionally, the image matting system 102 includes, but is not limited to, a digital image manager 502, a trimap segmentation manager 504, an encoder manager 506, a decoder manager 508, an alpha matte manager 510, and a data storage manager 512. The image matting system 102 can be implemented on any number of computing devices. For example, the image matting system 102 can be implemented in a distributed system of server devices for generating alpha mattes of digital images. The image matting system 102 can also be implemented within one or more additional systems. Alternatively, the image matting system 102 can be implemented on a single computing device such as a single client device.

In one or more embodiments, each of the components of the image matting system 102 is in communication with other components using any suitable communication technologies. Additionally, the components of the image matting system 102 are capable of being in communication with one or more other devices including other computing devices of a user, server devices (e.g., cloud storage devices), licensing servers, or other devices/systems. It will be recognized that although the components of the image matting system 102 are shown to be separate in FIG. 5, any of the subcomponents may be combined into fewer components, such as into a single component, or divided into more components as may serve a particular implementation. Furthermore, although the components of FIG. 5 are described in connection with the image matting system 102, at least some of the components for performing operations in conjunction with the image matting system 102 described herein may be implemented on other devices within the environment.

In some embodiments, the components of the image matting system 102 include software, hardware, or both. For example, the components of the image matting system 102 include one or more instructions stored on a computer-readable storage medium and executable by processors of one or more computing devices (e.g., the computing device(s) 500). When executed by the one or more processors, the computer-executable instructions of the image matting system 102 cause the computing device(s) 500 to perform the operations described herein. Alternatively, the components of the image matting system 102 can include hardware, such as a special purpose processing device to perform a certain function or group of functions. Additionally, or alternatively, the components of the image matting system 102 can include a combination of computer-executable instructions and hardware.

Furthermore, the components of the image matting system 102 performing the functions described herein with respect to the image matting system 102 may, for example, be implemented as part of a stand-alone application, as a module of an application, as a plug-in for applications, as a library function or functions that may be called by other applications, and/or as a cloud-computing model. Thus, the components of the image matting system 102 may be implemented as part of a stand-alone application on a personal computing device or a mobile device. Alternatively, or additionally, the components of the image matting system 102 may be implemented in any application that provides digital image modification, including, but not limited to ADOBE® CREATIVE CLOUD®, ADOBE® PHOTOSHOP®, ADOBE® AFTER EFFECTS®, ADOBE® PHOTOSHOP® LIGHTROOM® or ADOBE® PHOTOSHOP® EXPRESS software. "ADOBE," "CREATIVE CLOUD," "PHOTOSHOP," "AFTER EFFECTS," "LIGHTROOM," and "PHOTOSHOP EXPRESS" are either registered trademarks or trademarks of Adobe Inc. in the United States and/or other countries.

As illustrated, the image matting system 102 includes the digital image manager 502 to manage digital images. For example, the digital image manager 502 receives or otherwise obtains digital images for modifying via alpha mattes. To illustrate, the digital image manager 502 receives a digital image in connection with a request to generate an alpha matte for the digital image. The digital image manager 502 can communicate with another device (e.g., a client device or an image repository) to obtain the digital image.

The image matting system 102 also includes the trimap segmentation manager 504 to manage trimap segmentations for digital images. For instance, the trimap segmentation manager 504 generates trimap segmentations for digital images utilizing a trimap generation neural network. Alternatively, the trimap segmentations manager generates trimap segmentations in response to user inputs to generate the trimap segmentations.

In one or more embodiments, the image matting system 102 includes the encoder manager 506 to manage a transformer encoder. Specifically, the encoder manager 506 utilizes a transformer encoder to generate patch-based encodings for digital images to capture global context information from the digital images in the patch-based encodings. Additionally, in one or more embodiments, the encoder manager 506 manages training of the transformer encoder (e.g., via learning parameters of neural network layers in the transformer encoder).

The image matting system 102 further includes the decoder manager 508 to generate alpha mattes from patch-based encodings provided by the encoder manager 506. To illustrate, the decoder manager 508 manages a plurality of upsampling layers and a plurality of neural network layers (e.g., multilayer perceptron layers) connected to the upsampling layers via skip connections. In additional embodiments, the decoder manager 508 also manages training of the decoder (e.g., via learning parameters of neural network layers in the decoder). In additional embodiments, the decoder manager 508 (or the encoder manager 506) manages a plurality of convolutional neural network layers connected to the upsampling layers to capture local context information.

In additional embodiments, the alpha matte manager 510 manages alpha mattes generated by the decoder manager 508. For example, the alpha matte manager 510 provides alpha mattes generated for digital images for display with the digital images in response to requests to generate the alpha mattes. To illustrate, the alpha matte manager 510 generates image layers for alpha mattes for modifying the digital images according to the alpha mattes.

The image matting system 102 also includes a data storage manager 512 (that comprises a non-transitory computer memory/one or more memory devices) that stores and maintains data associated with generating alpha mattes from digital images. For example, the data storage manager 512 stores data associated with training and implementing neural network layers in a transformer-based encoder-decoder. To illustrate, the data storage manager 512 stores digital images, trimap segmentations, and features and encodings extracted from the digital images and trimap segmentations.

Figure 6:
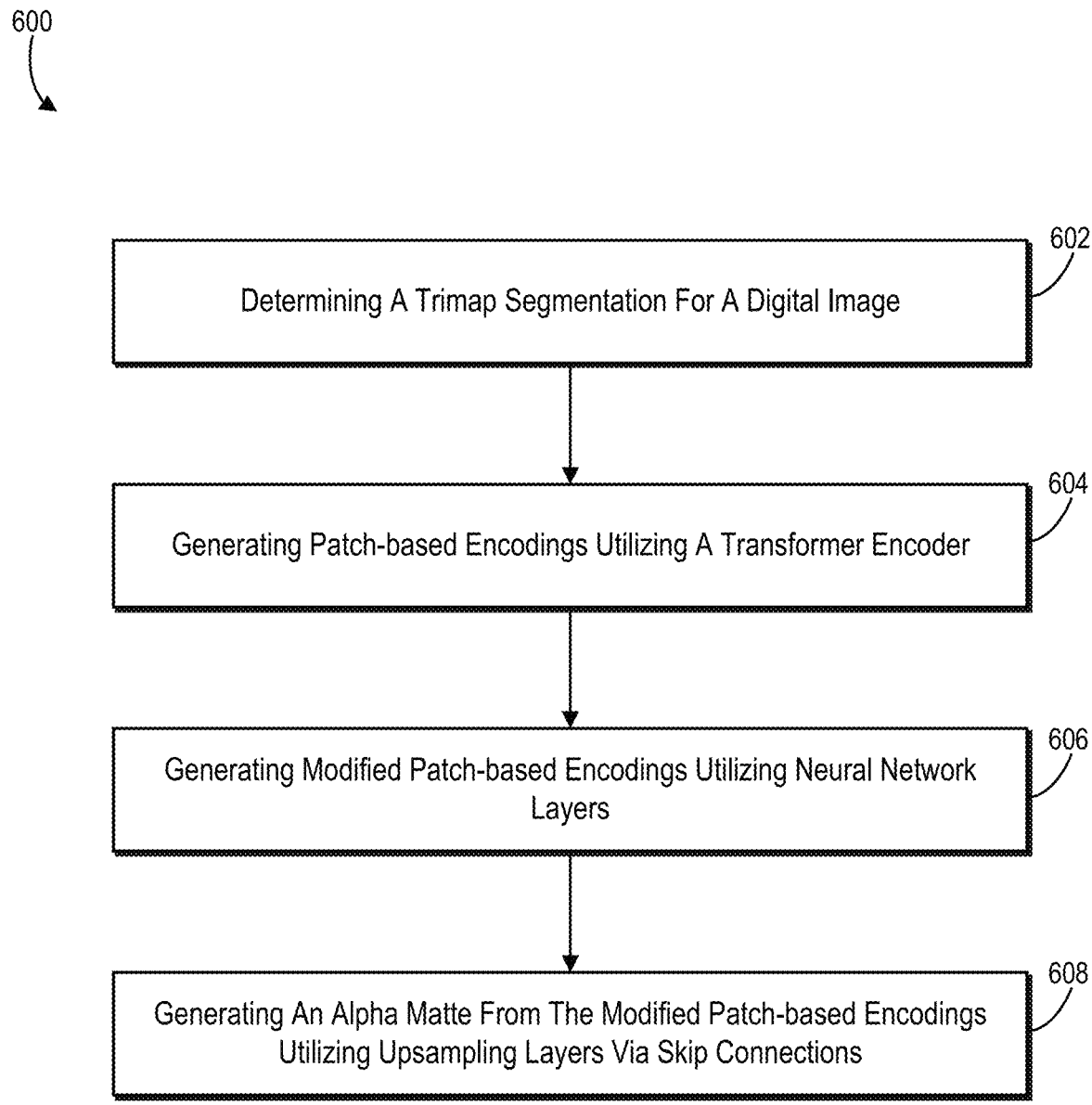
FIG. 6 illustrates a flowchart of a series of acts for generating an alpha matte utilizing a transformer-based encoder-decoder in accordance with one or more implementations.

Turning now to FIG. 6, this figure shows a flowchart of a series of acts 600 of generating an alpha matte for a digital image utilizing a transformer-based encoder-decoder. While FIG. 6 illustrates acts according to one embodiment, alternative embodiments may omit, add to, reorder, and/or modify any of the acts shown in FIG. 6. The acts of FIG. 6 can be performed as part of a method. Alternatively, a non-transitory computer readable medium can comprise instructions, that when executed by one or more processors, cause a computing device to perform the acts of FIG. 6. In still further embodiments, a system can perform the acts of FIG. 6.

As shown, the series of acts 600 includes an act 602 of determining a trimap segmentation for a digital image. For example, act 602 involves determining a trimap segmentation for a digital image, the trimap segmentation comprising a foreground region, a background region, and a blended boundary region of the digital image. Act 602 can involve generating the trimap segmentation utilizing a trimap segmentation neural network. Act 602 can involve determining the trimap segmentation based on a user input indicating the foreground region, the background region, and the blended boundary region of the digital image.

The series of acts 600 also includes an act 604 of generating patch-based encodings utilizing a transformer encoder. For example, act 604 involves generating one or more patch-based encodings from the digital image and the trimap segmentation utilizing a transformer encoder that generates patch encodings of regions of the digital image and compares areas of the digital image to the patch encodings.

Act 604 can involve generating the one or more patch-based encodings utilizing a plurality of transformer neural network layers of the transformer encoder, each transformer neural network layer of the plurality of transformer neural network layers comprising a plurality of self-attention layers and a plurality of feedforward neural network layers. For example, a transformer neural network layer of the plurality of transformer neural network layers includes a plurality of patch encoding layers that generate encodings by comparing the patch encodings of the regions of the digital image to the areas of the digital image, each patch encoding layer comprising a self-attention neural network and a feedforward neural network layer. Additionally, a transformer neural network layer of the plurality of transformer neural network layers includes a patch merging layer that generates a patch-based encoding of the plurality of patch-based encodings by combining the encodings generated by the plurality of patch encoding layers.

Act 604 can also involve generating the one or more patch-based encodings utilizing the plurality of transformer neural networks by, for each transformer neural network layer of the plurality of transformer neural network layers, utilizing a patch merging layer to combine encodings generated by the plurality of self-attention layers and the plurality of feedforward neural network layers.

For example, act 604 can involve generating a first patch-based encoding at a first resolution utilizing a first transformer neural network layer. Act 604 can also involve generating a second patch-based encoding at a second resolution lower than the first resolution utilizing a second transformer neural network layer.

Additionally, the series of acts 600 includes an act 606 of generating modified patch-based encodings utilizing neural network layers. For example, act 606 involves generating a plurality of modified patch-based encodings from the plurality of patch-based encodings utilizing a plurality of neural network layers.

Act 606 can involve generating a first modified patch-based encoding from the first patch-based encoding utilizing a first neural network layer of the plurality of neural network layers. For instance, act 606 can involve generating the first modified patch-based encoding utilizing a multilayer perceptron layer. Act 606 can also involve generating a second modified patch-based encoding from the second patch-based encoding utilizing a second neural network layer of the plurality of neural network layers. Additionally, act 606 can involve generating the second modified patch-based encoding utilizing an additional multilayer perceptron layer.

Furthermore, the series of acts 600 includes an act 608 of generating an alpha matte from the modified patch-based encodings utilizing upsampling layers via skip connections. For example, act 608 involves generating an alpha matte for the digital image from the one or more patch-based encodings utilizing a decoder comprising a plurality of upsampling layers connected to a plurality of neural network layers via a plurality of skip connections.

Additionally, act 608 can involve generating, utilizing a first upsampling layer of the plurality of upsampling layers, a first upsampled feature map from the second modified patch-based encoding from the second neural network layer. Act 608 can involve generating, utilizing a second upsampling layer of the plurality of upsampling layers, a second upsampled feature map from the first modified patch-based encoding from the first neural network layer and the first upsampled feature map. Act 608 can then involve determining the alpha matte from the second upsampled feature map.

The series of acts 600 can also include extracting one or more feature sets from the digital image and the trimap segmentation utilizing an additional encoder in parallel with the transformer encoder. The series of acts 600 can include generating, utilizing a plurality of convolutional neural network layers, a plurality of feature sets at a plurality of resolutions based on local features from image patches of the digital image. For example, the series of acts 600 can include extracting a plurality of feature sets from the digital image and the trimap segmentation utilizing a plurality of convolutional neural network layers in parallel with the transformer encoder. The series of acts 600 can include encoding, utilizing a first convolutional neural network layer of the plurality of convolutional neural network layers, first local features from image patches of the digital image based on the digital image and the trimap segmentation. The series of acts 600 can include downsampling the first local features encoded from the image patches to a downsampled resolution utilizing the first convolutional neural network layer. The series of acts 600 can then include encoding, utilizing a second convolutional neural network layer of the plurality of convolutional neural network layers, second local features from image patches of the digital image based on the first local features at the downsampled resolution.

Additionally, act 608 can involve generating the alpha matte further based on the plurality of feature sets via a plurality of additional skip connections with the plurality of upsampling layers. For example, act 608 involves generating a plurality of upsampling feature sets utilizing a subset of the plurality of upsampling layers based on a first skip connection connecting the second convolutional neural network layer to a first upsampling layer of the plurality of upsampling layers at a first resolution, and a second skip connection connecting the first convolutional neural network layer to a second upsampling layer of the plurality of upsampling layers at a second resolution higher than the first resolution.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 7:
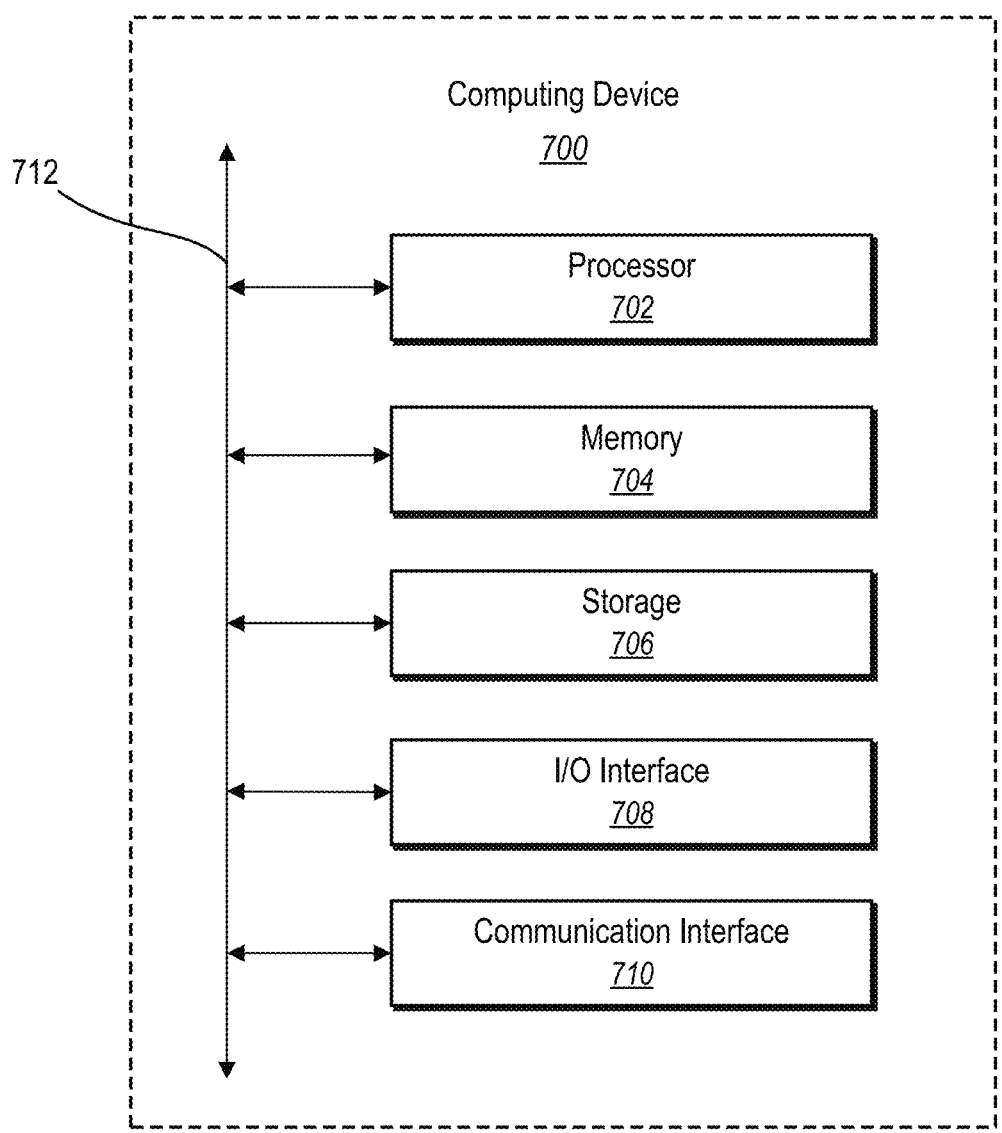
FIG. 7 illustrates a block diagram of an exemplary computing device in accordance with one or more embodiments.

FIG. 7 illustrates a block diagram of exemplary computing device 700 that may be configured to perform one or more of the processes described above. One will appreciate that one or more computing devices such as the computing device 700 may implement the system(s) of FIG. 1. As shown by FIG. 7, the computing device 700 can comprise a processor 702, a memory 704, a storage device 706, an I/O interface 708, and a communication interface 710, which may be communicatively coupled by way of a communication infrastructure 712. In certain embodiments, the computing device 700 can include fewer or more components than those shown in FIG. 7. Components of the computing device 700 shown in FIG. 7 will now be described in additional detail.

In one or more embodiments, the processor 702 includes hardware for executing instructions, such as those making up a computer program. As an example, and not by way of limitation, to execute instructions for dynamically modifying workflows, the processor 702 may retrieve (or fetch) the instructions from an internal register, an internal cache, the memory 704, or the storage device 706 and decode and execute them. The memory 704 may be a volatile or non-volatile memory used for storing data, metadata, and programs for execution by the processor(s). The storage device 706 includes storage, such as a hard disk, flash disk drive, or other digital storage device, for storing data or instructions for performing the methods described herein.

The I/O interface 708 allows a user to provide input to, receive output from, and otherwise transfer data to and receive data from computing device 700. The I/O interface 708 may include a mouse, a keypad or a keyboard, a touch screen, a camera, an optical scanner, network interface, modem, other known I/O devices or a combination of such I/O interfaces. The I/O interface 708 may include one or more devices for presenting output to a user, including, but not limited to, a graphics engine, a display (e.g., a display screen), one or more output drivers (e.g., display drivers), one or more audio speakers, and one or more audio drivers. In certain embodiments, the I/O interface 708 is configured to provide graphical data to a display for presentation to a user. The graphical data may be representative of one or more graphical user interfaces and/or any other graphical content as may serve a particular implementation.

The communication interface 710 can include hardware, software, or both. In any event, the communication interface 710 can provide one or more interfaces for communication (such as, for example, packet-based communication) between the computing device 700 and one or more other computing devices or networks. As an example, and not by way of limitation, the communication interface 710 may include a network interface controller (NIC) or network adapter for communicating with an Ethernet or other wire-based network or a wireless NIC (WNIC) or wireless adapter for communicating with a wireless network, such as a WI-FI.

Additionally, the communication interface 710 may facilitate communications with various types of wired or wireless networks. The communication interface 710 may also facilitate communications using various communication protocols. The communication infrastructure 712 may also include hardware, software, or both that couples components of the computing device 700 to each other. For example, the communication interface 710 may use one or more networks and/or protocols to enable a plurality of computing devices connected by a particular infrastructure to communicate with each other to perform one or more aspects of the processes described herein. To illustrate, the digital content campaign management process can allow a plurality of devices (e.g., a client device and server devices) to exchange information using various communication networks and protocols for sharing information such as electronic messages, user interaction information, engagement metrics, or campaign management resources.

In the foregoing specification, the present disclosure has been described with reference to specific exemplary embodiments thereof. Various embodiments and aspects of the present disclosure(s) are described with reference to details discussed herein, and the accompanying drawings illustrate the various embodiments. The description above and drawings are illustrative of the disclosure and are not to be construed as limiting the disclosure. Numerous specific details are described to provide a thorough understanding of various embodiments of the present disclosure.

The present disclosure may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the present application is, therefore, indicated by the appended claims rather than by the foregoing description. All changes that come within the meaning and range of equivalency of the claims are to be embraced within their scope.

What is claimed is:

1. A computer-implemented method comprising:
   determining a trimap segmentation for a digital image, the trimap segmentation comprising a foreground region, a background region, and a blended boundary region of the digital image;
   generating, by at least one processor, patch-based encodings from the digital image and the trimap segmentation utilizing a transformer encoder comprising a plurality of transformer neural network layers that generate patch encodings of regions of the digital image and compare areas of the digital image to the patch encodings;

generating, utilizing a plurality of additional network layers, modified patch-based encodings from the patch-based encodings generated by the plurality of transformer neural network layers; and generating, by the at least one processor, an alpha matte for the digital image from the patch-based encodings and the modified patch-based encodings utilizing a decoder comprising a plurality of upsampling layers connected to the plurality of additional neural network layers via a plurality of skip connections.

2. The computer-implemented method as recited in claim 1, further comprising generating the patch-based encodings utilizing the plurality of transformer neural network layers of the transformer encoder, each transformer neural network layer of the plurality of transformer neural network layers comprising a plurality of self-attention layers and a plurality of feedforward neural network layers.

3. The computer-implemented method as recited in claim 2, further comprising generating the patch-based encodings utilizing the plurality of transformer neural network layers by, for each transformer neural network layer of the plurality of transformer neural network layers, utilizing a patch merging layer to combine encodings generated by the plurality of self-attention layers and the plurality of feedforward neural network layers.

4. The computer-implemented method as recited in claim 1, wherein generating the patch-based encodings from the digital image and the trimap segmentation comprises:

generating a first patch-based encoding at a first resolution utilizing a first transformer neural network layer; and generating a second patch-based encoding at a second resolution lower than the first resolution utilizing a second transformer neural network layer.

5. The computer-implemented method as recited in claim 4, wherein generating the modified patch-based encodings comprises:

generating a first modified patch-based encoding from the first patch-based encoding utilizing a first neural network layer of the plurality of additional neural network layers; and generating a second modified patch-based encoding from the second patch-based encoding utilizing a second neural network layer of the plurality of additional neural network layers.

6. The computer-implemented method as recited in claim 5, wherein generating the alpha matte for the digital image from the patch-based encodings comprises:

generating, utilizing a first upsampling layer of the plurality of upsampling layers, a first upsampled feature map from the second modified patch-based encoding from the second neural network layer;

generating, utilizing a second upsampling layer of the plurality of upsampling layers, a second upsampled feature map from the first modified patch-based encoding from the first neural network layer and the first upsampled feature map; and determining the alpha matte from the second upsampled feature map.

7. The computer-implemented method as recited in claim 5, wherein generating the first modified patch-based encoding from the first patch-based encoding utilizing the first neural network layer comprises generating the first modified patch-based encoding utilizing a multilayer perceptron layer.

8. The computer-implemented method as recited in claim 1, further comprising:

extracting a plurality of feature sets from the digital image and the trimap segmentation utilizing a plurality of convolutional neural network layers in parallel with the transformer encoder, wherein generating the alpha matte for the digital image comprises generating the alpha matte further based on the plurality of feature sets via a plurality of additional skip connections with the plurality of upsampling layers.

9. The computer-implemented method as recited in claim 8, wherein extracting the plurality of feature sets comprises:

encoding, utilizing a first convolutional neural network layer of the plurality of convolutional neural network layers, first local features from image patches of the digital image based on the digital image and the trimap segmentation;

downsampling the first local features encoded from the image patches to a downsampled resolution utilizing the first convolutional neural network layer; and encoding, utilizing a second convolutional neural network layer of the plurality of convolutional neural network layers, second local features from image patches of the digital image based on the first local features at the downsampled resolution.

10. A system comprising:

one or more memory devices comprising a digital image and a trimap segmentation for the digital image; and one or more servers configured to cause the system to:

generate a plurality of patch-based encodings from the digital image and the trimap segmentation utilizing a transformer encoder comprising a plurality of transformer neural network layers, each transformer neural network layer of the plurality of transformer neural network layers comprising a plurality of patch encoding layers including a self-attention layer and a feedforward neural network layer;

generate a plurality of modified patch-based encodings from the plurality of patch-based encodings utilizing a plurality of additional neural network layers connected to the transformer encoder and a decoder via a plurality of skip connections; and generate an alpha matte for the digital image from the plurality of patch-based encodings and the plurality of modified patch-based encodings utilizing the decoder comprising a plurality of upsampling layers connected to the plurality of additional neural network layers via the plurality of skip connections.

11. The system as recited in claim 10, wherein the one or more servers are further configured to cause the system to generate a patch-based encoding of the plurality of patch-based encodings by comparing patch encodings of regions of the digital image to areas of the digital image utilizing a transformer neural network layer of the plurality of transformer neural network layers.

12. The system as recited in claim 10, wherein each transformer neural network layer of the plurality of transformer neural network layers further comprises a patch merging layer that combines encodings generated by the plurality of patch encoding layers.

13. The system as recited in claim 10, wherein the one or more servers are further configured to cause the system to:

extract one or more feature sets from the digital image and the trimap segmentation utilizing an additional encoder in parallel with the transformer encoder; and generate the alpha matte based on the plurality of patch-based encodings and the one or more feature sets via a subset of the plurality of upsampling layers and one or more additional skip connections between the additional encoder and the subset of the plurality of upsampling layers.

14. The system as recited in claim 13, wherein the one or more servers are further configured to cause the system to:
  extract a first feature set from the digital image and the trimap segmentation utilizing a first convolutional neural network layer of the additional encoder;
  extract a second feature set from the first feature set utilizing a second convolutional neural network layer of the additional encoder; and
  generate the alpha matte for the digital image based on the plurality of patch-based encodings and further based on the first feature set and the second feature set utilizing the subset of the plurality of upsampling layers.

15. The system as recited in claim 14, wherein generating the alpha matte for the digital image comprises generating a plurality of upsampled feature maps utilizing the subset of the plurality of upsampling layers based on:
  a first skip connection connecting the second convolutional neural network layer to a first upsampling layer of the plurality of upsampling layers at a first resolution; and
  a second skip connection connecting the first convolutional neural network layer to a second upsampling layer of the plurality of upsampling layers at a second resolution higher than the first resolution.

16. A non-transitory computer readable storage medium comprising instructions that, when executed by at least one processor, cause a computing device to:
  generate a plurality of patch-based encodings from a digital image utilizing a plurality of transformer neural network layers of a transformer encoder; and
  generate an alpha matte for the digital image from the plurality of patch-based encodings utilizing a decoder comprising a plurality of additional neural network layers and a plurality of upsampling layers by:
    generating a plurality of modified patch-based encodings from the plurality of patch-based encodings utilizing the plurality of additional neural network layers; and
    generating the alpha matte from the plurality of patch-based encodings and the plurality of modified patch-based encodings utilizing the plurality of upsampling layers connected to the plurality of additional neural network layers via a plurality of skip connections.

17. The non-transitory computer readable storage medium as recited in claim 16, further comprising instructions that, when executed by the at least one processor, cause the computing device to generate the plurality of modified patch-based encodings utilizing the plurality of additional neural network layers comprising a plurality of multilayer perceptron layers connected to the plurality of upsampling layers via the plurality of skip connections at a plurality of resolutions, the plurality of multilayer perceptron layers unifying channel dimensions of the plurality of patch-based encodings at the plurality of resolutions via the plurality of skip connections.

18. The non-transitory computer readable storage medium as recited in claim 16, further comprising instructions that, when executed by the at least one processor, cause the computing device to:
  generate, utilizing a plurality of convolutional neural network layers, a plurality of feature sets at a plurality of resolutions based on local features from image patches of the digital image; and
  generate the alpha matte for the digital image from the plurality of patch-based encodings in connection with the plurality of feature sets.

19. The non-transitory computer readable storage medium as recited in claim 18, further comprising instructions that, when executed by the at least one processor, cause the computing device to generate the plurality of feature sets based on the plurality of convolutional neural network layers being connected to a subset of the plurality of upsampling layers via a plurality of additional skip connections.

20. The non-transitory computer readable storage medium as recited in claim 16, further comprising instructions that, when executed by the at least one processor, cause the computing device to generate the plurality of patch-based encodings from the digital image utilizing a plurality of transformer neural network layers, a transformer neural network layer of the plurality of transformer neural network layers comprising:
  a plurality of patch encoding layers that generate encodings by comparing patch encodings of regions of the digital image to areas of the digital image, each patch encoding layer comprising a self-attention neural network and a feedforward neural network layer; and
  a patch merging layer that generates a patch-based encoding of the plurality of patch-based encodings by combining the encodings generated by the plurality of patch encoding layers.

* * * * *